United States Patent
Feng

(10) Patent No.: US 9,915,740 B1
(45) Date of Patent: Mar. 13, 2018

(54) HIGH-SYMMETRY ORGANIC SCINTILLATOR SYSTEMS

(71) Applicant: National Technology and Engineering Solutions of Sandia, LLC, Albuquerque, NM (US)

(72) Inventor: Patrick L. Feng, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/592,002

(22) Filed: May 10, 2017

Related U.S. Application Data

(62) Division of application No. 14/537,466, filed on Nov. 10, 2014, now Pat. No. 9,678,225.

(51) Int. Cl.
*G01T 1/20* (2006.01)
*G01T 1/208* (2006.01)

(52) U.S. Cl.
CPC ............ *G01T 1/208* (2013.01); *G01T 1/2018* (2013.01)

(58) Field of Classification Search
None
See application file for complete search history.

(56) References Cited

U.S. PATENT DOCUMENTS

| | | | |
|---|---|---|---|
| 5,134,293 A | 7/1992 | Anderson | |
| 6,337,482 B1 | 1/2002 | Francke et al. | |
| 7,180,068 B1 | 2/2007 | Brecher et al. | |
| 7,462,897 B2 | 12/2008 | Endo | |
| 7,737,437 B2 | 6/2010 | Yamazaki et al. | |
| 8,263,971 B2 | 9/2012 | Pieh | |
| 9,678,225 B1 | 6/2017 | Feng | |

(Continued)

FOREIGN PATENT DOCUMENTS

| | | |
|---|---|---|
| EP | 2 067 839 A1 | 6/2009 |
| JP | 11-160444 | 6/1999 |

(Continued)

OTHER PUBLICATIONS

"EJ-301 Liquid Scintillator", Downloaded from website http://www.eljentechnology.com., Retrieved on Nov. 10, 2014, 2pp.

(Continued)

*Primary Examiner* — Edwin Gunberg
(74) *Attorney, Agent, or Firm* — Medley, Behrens & Lewis, LLC

(57) ABSTRACT

An ionizing radiation detector or scintillator system includes a scintillating material comprising an organic crystalline compound selected to generate photons in response to the passage of ionizing radiation. The organic compound has a crystalline symmetry of higher order than monoclinic, for example an orthorhombic, trigonal, tetragonal, hexagonal, or cubic symmetry. A photodetector is optically coupled to the scintillating material, and configured to generate electronic signals having pulse shapes based on the photons generated in the scintillating material. A discriminator is coupled to the photon detector, and configured to discriminate between neutrons and gamma rays in the ionizing radiation based on the pulse shapes of the output signals.

14 Claims, 19 Drawing Sheets

(56) References Cited

U.S. PATENT DOCUMENTS

| | | | |
|---|---|---|---|
| 2007/0205712 A1* | 9/2007 | Radkov | C09K 11/0838 313/503 |
| 2011/0049367 A1 | 5/2011 | Forrest et al. | |
| 2011/0108738 A1 | 5/2011 | Doty | |

FOREIGN PATENT DOCUMENTS

| | | |
|---|---|---|
| JP | 2009-046598 | 3/2009 |
| WO | 2009/117613 A1 | 9/2009 |
| WO | 2011/060085 A2 | 5/2011 |

OTHER PUBLICATIONS

Ams, et al., "Control of stilbene conformation and fluorescence in self-assembled capsules", Beilstein Journal of Organic Chemistry; vol. 5, No. 79, 2009, 1-4.

Arulchakkaravarthi, et al., "Studies on microhardness and slip systems of Bridgman grown trans-stilbene crystals", Materials Letters—Journal vol. 51, 2001, 151-155.

Brooks, "A scintillation counter with neutron and gamma-ray discriminators", Nuclear Instruments and Methods in Physics; vol. 4, 1959, 151-163.

Brooks, "Development of organic scintillators", Nuclear Instruments and Methods in Physics; vol. 162, 1979, 477-505.

Budakovsky, et al., "New effective organic scintillators for fast neutron and short-range radiation detection", IEEE Transactions on Nuclear Science vol. 54, 2007, 2734-2740.

Campbell, I. et al., "Efficient plastic scintillators utilizing phosphorescent dopants", Applied Physics Letters, No. 90, 2007, Jan. 21, 2017.

Czirr, et al., "Calibration and performance of a neutron-time-of-flight detector", Nuclear Instruments and Methods; vol. 31, 1964, 226-232.

Doty, et al., "Use of Metal Organic Fluors for Spectral Discrimination of Neutrons and Gammas", Sandia Report, SAND: 2010-6724, Sep. 2010, 25 pages.

Dyck, et al., "Ultraviolet spectra of stilbene, p-monohalogen stilbenes, and azobenzene and the trans to cis photoisomerization process", The Journal of Chemical Physics, vol. 36, No. 9, 1962, 2326-2345.

Feng, et al., "Pulse-Shape Discrimination in High-Symmetry Organic Scintillators", IEEE Transactions on Nuclear Science, vol. 60, No. 4, Aug. 2013, 3142-3149.

Feng, et al., "Spectral- and Pulse-Shape Discrimination in Triplet-Harvesting Plastic Scintillators", IEEE Transactions on Nuclear Science; vol. 59, No. 6, 2012, 3312-3319.

Hull, et al., "New organic crystals for pulse shape discrimination", IEEE Transactions Nuclear Science; vol. 56, 2009, 899-903.

Karl, "Charge carrier transport in organic semiconductors", Synthetic Metals;, vol. 133-134, 2003, 649-657.

Kaschuck, et al., "Fast neutron spectrometry with organic scintillators applied to magnetic fusion experiments", Nuclear Instruments and Methods in Physics Research A, 476, 2002, 511-515.

Kirkpatrick, "Percolation and Conduction", Reviews of Modern Physics, vol. 45, No. 4, Oct. 1973, 574-588.

Lakowicz, et al., "Quenching of fluorescence by oxygen. A probe for structural fluctuations in macromolecules", Biochemistry, vol. 12, No. 21, 1973, 4161-4170.

Lauck et al., "Low-Afterglow, High-Refractive-Index Liquid Scintillators for Fast-Neutron Spectrometry and Imaging Applications", IEEE Transactions on Nuclear Science, vol. 56, 2009, 989-993.

Li, et al., "Organic light-emitting devices based on aromatic polyimide doped by electrophosphorescent material fac tris(2-phenylpyridine) iridium", Semiconductor Science and Technology, No. 18, Feb. 2003, pp. 278-283.

Ortmann, et al., "Charge transport in organic crystals: Theory and Modelling", Physics Status Solidi; vol. 248, No. 3, 2011, 511-525.

Prakash, et al., "Creep of metal-type organic compounds-I. pure polycrystals and particle-hardened systems", Acta Metallurgica et Materialia, vol. 40, No. 12, 1992, 3443-3449.

Reese, et al., "Isotropic transport in an oligothiophene derivative for single-crystal field-effect transistor applications", Applied Physics Letters; vol. 94, 2009, 202101-202103.

Rybakov, et al., "Fast-neutron spectroscopy", Consultants Bureau, Inc, 1960, 1-31.

Thompson, M. , "The evolution of organometallic complexes in organic light-emitting diodes", MRS Bulletin, vol. 32, 2007, pp. 694-701.

Tirsell, et al., "Sub-nanosecond plastic scintillator time response studies using laser produced X-ray pulsed excitation", IEEE Transactions on Nuclear Science, vol. NS-24, 1977, 250-254.

Tsuboi, et al., "Energy transfer between $Ir(ppy)_3$ molecules in neat film and concentration quenching of phosphorescence", Optical Materials, 30, 2008, 1375-1381.

Valiev, et al., "NWChem: A comprehensive and scalable open-source solution for large scale molecular simulations", Computer Physics Communications, 181, 2010, 1477-1489.

Whittlestone, "The effect of pulse pile-up on discrimination between neutrons and gamma rays", Nuclear Instruments and Methods, 173, 1980, 347-350.

Yamazaki, et al., "Picosecond Fluorescence Spectroscopy on Excimer Formation and Excitation Energy Transfer of Pyrene in Langmuir-Blodgett Monolayer Films", Journal of Physical Chemistry, 91, 1987, 3572-3577.

Yanai, et al., "A new hybrid exchange-correlation functional using the Coulomb-attenuating method (CAM-B3LYP)", Chemical Physics Letters 393, 2004, 51-57.

Yeganeh, et al., "Triplet Excitation Energy Transfer with Constrained Density Functional Theory", Journal of Physical Chemistry, vol. 144, 2010, 20756-20763.

Zaitseva, et al., "Application of solution techniques for rapid growth of organic crystals", Journal of Crystal Growth, 314, 2011, 163-170.

Zaitseva, et al., "Plastic scintillators with efficient neutron/gamma pulse shape discrimination", Nuclear Instruments and Methods in Physics Research A 668, 2012, 88-93.

Zaitseva, et al., "Pulse shape discrimination in impure and mixed single-crystal organic scintillators", IEEE Transactions on Nuclear Science, vol. 58, No. 6, 2011, 3411-3420.

International Search Report and Written Opinion dated Jun. 23, 2011 for Application No. PCT/US2010/056258.

Chen et al., "High-performance polymer light-emitting diodes doped with a red phosphorescent iridium complex", Applied Physics Letters, vol. 80, No. 13, 2002, 2308-2310.

European Search Report and European Search Opinion dated Jun. 26, 2014, for EP Application No. 10 83 0671.3.

Doty et al., "Scintillating Metal-Organic Frameworks: A New Class of Radiation Detection Materials", Advanced materials, 21, 2009, 95-101.

Eddaoudi et al., "Systematic Design of Pore Size and Functionality in Isoreticular MOFs and Their Application in Methane Storage", Science, vol. 295, 2002, 469-472.

Horrocks, "Pulse Shape Discrimination with Organic Liquid Scintillator Solutions", Applied Spectroscopy, vol. 24, 1970, 397-404.

Klein et al., "A Mesoporous Metal-Organic Framework", Angewandte Chemie International Edition, vol. 48, 2009, 9954-9957.

Laustriat, "The luminescence decay of organic scintillators", Molecular Crystals, vol. 4, 1968, 127-145.

Ockwig et al., "Reticular Chemistry: Occurrence and Taxonomy of Nets and Grammar for the Design of Frameworks", Accounts of Chemical Research, vol. 38, No. 3, 2005, 176-182.

Surblé et al., "A new isoreticular class of metal-organic-frameworks with the MIL-88 topology", Chemical Communications, 2006, 284-286.

Yaghi et al., "Selective Guest Binding by Tailored Channels in a 3-D Porous Zinc(II)-Benzenetricarboxylate Network", Journal of the American Chemical Society, 119, 1997, 2861-2868.

Yaghi et al., "Reticular synthesis and the design of new materials", Nature, vol. 423, 2003, 705-714.

(56) References Cited

OTHER PUBLICATIONS

"Restriction Requirement for U.S. Appl. No. 14/537,466", dated May 13, 2016, 17 pages.
"Response to the Restriction Requirement for U.S. Appl. No. 14/537,466", filed Jul. 7, 2016, 3 pages.
"Non-Final Office Action for U.S. Appl. No. 14/537,466", dated Sep. 23, 2016, 8 pages.
"Response to the Non-Final Office Action for U.S. Appl. No. 14/537,466", filed Dec. 19, 2016, 10 pages.
"Notice of Allowance and Fees Due for U.S. Appl. No. 14/537,466", dated Feb. 15, 2017, 8 pages.

* cited by examiner

HIGH-SYMMETRY ORGANIC SCINTILLATOR SYSTEMS

CROSS-REFERENCE TO RELATED APPLICATIONS

This application is a divisional application of, and discloses subject matter that is related to subject matters disclosed in, co-pending parent application U.S. Ser. No. 14/537,466, filed Nov. 10, 2014 and entitled "HIGH-SYMMETRY ORGANIC SCINTILLATOR SYSTEMS". The present application claims the priority of its parent application, which is incorporated herein by reference in its entirety for any purpose.

STATEMENT REGARDING RESEARCH & DEVELOPMENT

This invention was made with Government support under Contract No. DE-NA0003525 awarded by the United States Department of Energy/National Nuclear Security Administration. The U.S. Government has certain rights in the invention.

TECHNICAL FIELD

Examples described herein are directed to the field of scintillator detector systems for ionizing radiation. Example scintillator systems are described that are suitable for fast neutron discrimination, source identification, detecting special nuclear materials, or combinations thereof.

BACKGROUND

Direct detection of fast neutrons is useful for the identification of special nuclear materials (SNM), including fissile materials relevant to nuclear non-proliferation, monitoring and verification. Typically, pulse-shape discrimination (PSD) is employed in organic scintillator systems due to the high sensitivity, low cost, and effectiveness in separating fast neutron events from background gamma radiation.

Scintillation and pulse-shape discrimination capability were first demonstrated in organic molecular crystals dating back to the early 1950's. Since then, a variety of different organic liquid scintillators and scintillating plastics have been developed for use in scalable, low-cost particle detection and discrimination systems. In spite of these significant advances, however, molecular crystals remain among the best materials for high fidelity measurements and fundamental energy loss studies, due to their ordered crystallographic structures and superior pulse-shape discrimination performance.

Pulse-shape discrimination in organic scintillators depends upon differences in the specific energy loss (dE/dX) of different types of ionizing particles within the scintillator material, and the corresponding effect on the relative proportion of prompt and delayed luminescence, as generated via fluorescence from singlet excited states and diffusion-controlled triplet-triplet annihilation (TTA), respectively.

Scintillators generally refer to materials which emit prompt luminescence when exposed to ionizing radiation. When excited by ionizing radiation, electrons may be freed from atoms of the scintillating material. The electrons and molecular ions recombine to form neutral states, including "singlet" (spin zero) and "triplet" (spin 1) excitation states. Singlet excited states generally refer to states in which the excited electron (spin ½) is paired with a ground state electron with opposite spin (total spin zero). Triplet excited states generally refer to states in which the excited electron is not paired with an opposite-spin ground state electron (total spin 1).

Approximately 25% of the electrons excited by ionizing radiation in a scintillating material may relax to singlet excited states, while 75% of the excited electrons may go to a triplet state. As the excited electrons relax to a ground state, they emit luminescence, but the characteristic emission time is not the same for luminescence generated from singlet and triplet states. In addition, the relative proportion of luminescence originating from singlet and triplet states is not the same for all particles. Neutron interactions, for example, are observed via elastic scattering from protons, which tend to generate relatively less luminescence from singlet versus triplet states, while gammas are observed via electron scattering and pair production, which tend to generate relatively more luminescence from singlet versus triplet states.

FIG. 1 is a schematic illustration of representative transitions experienced by excited electrons. Excited electrons occupying singlet (S1) states 102 may generally freely relax to a ground (S0) state 103, emitting luminescence photons 110 of energy hv, where h is the Planck constant and v is the frequency. Luminescence 110 generated based on relaxing singlet states is generally considered "fast" luminescence, occurring on a time scale of the order of nanoseconds, based on the singlet state excited electron making a direct radiative transition to the ground state in the scintillating material.

Excited electrons in triplet (T1) states 112 and 114 may not freely relax to a ground state, because transitions from a triplet (spin one) states to ground (spin zero or singlet) states are "spin-forbidden," based on symmetry considerations, while transitions from excited singlet (S1) states to singlet ground states (S0) are "spin-allowed." Pairs of excited electrons in triplet (T1) states 112 and 114 may however combine with one another via diffusive processes, generating an excited electron in a singlet (S1) state 116 and another electron in a ground (S0) state 118.

This diffusive process has a relatively longer time scale, for example on the order of hundreds of nanoseconds, as described below. The excited electron in the singlet (S1) state 116 can then relax to the ground (S0) state 120 via an allowed radiative transition, generating a delayed or "slow" luminescence photon 122 with energy hv. The uncombined triplet (T1) states tend to produce little or no direct or prompt luminescence, due to the lower probability of non-radiative transitions, and may instead result in much slower phosphorescence emission, with a time scale on the order of milliseconds or even longer. Such emissions are typically not significant in radiation measurements due to the low phosphorescence quantum yields of organic scintillators.

The mechanisms that control prompt emission from singlet states are understood within the framework of Förster dipole-dipole interactions, but less is known about the relative proportion and kinetics of triplet-derived (delayed) fluorescence. Studies have shown, however, that TTA efficiency depends upon the mobility and lifetime of the triplet excited states, both of which are governed by intermolecular interactions between chromophores.

The magnitude of the intermolecular interactions also depends upon the overlap between molecular orbitals (e.g., π orbital overlap). The overlap integrals are controlled by the configurational geometry and distance between adjacent molecules, which in turn are enforced by the crystallographic structure. In some organic scintillating materials delayed singlet luminescence may thus be observed, where the rate of the delayed luminescence component is determined by the rate of diffusion of the triplet states combining with one another within the scintillating material. Accordingly, delayed luminescence may exhibit a non-exponential decay profile, with a substantially longer lifetime. Typically, only a small fraction (such as two percent) of excited electrons in triplet states may undergo this recombination and relaxation to produce luminescence.

Thus, the fast (or prompt) and slow (or delayed) luminescence components can be used to discriminate between ionizing particles in scintillating systems, for example to discriminate between energetic neutrons and gamma ray photons. These are neutral particles, which must generally be converted to charged particles in order to be detected. Neutrons are typically observed based on the generation of recoil protons, whereas gammas are converted to fast electrons. Particle discrimination is possible at least in part because the relative proportion of the fast luminescence component is dependent on the energy deposited per unit distance (dE/dX) in the scintillating material, which tends to be less for electrons than protons. High ionization densities can quench the excited singlet π electrons, with non-luminescent de-excitation reducing the fast component for high dE/dX particles. This introduces non-linearity into the energy response, and results in different pulse shapes for different particle types.

FIG. 2 is a schematic illustration of the luminescence intensity generated by ionizing electrons and recoil protons, respectively. Intensity of the photon signal is indicated on the vertical axis, in arbitrary units. Time is shown on the horizontal scale, for example in nanoseconds (ns).

The luminescence or photon signal generated by a representative scattered electron is illustrated by dashed curve 202. The luminescence or photon signal generated by a recoil proton is illustrated by solid line 204. As illustrated in FIG. 2, the initial "fast" luminescence intensity 210 may vary according to dE/dx, and therefore differ between the electron and recoil proton, with the electron producing a relatively greater fast luminescence component.

In this particular example, the decay data for electron excitation 202 and proton excitation 204 have been normalized to the respective delayed luminescence signals 212. Each particle type produces a different relative proportion of fast and slow components. These effects can be used to differentiate signals from the different particle types based on the relative fast and slow components in the light signals from different particles, a technique referred to as pulse-shape discrimination (PSD).

FIG. 3 is a schematic illustration of a scintillator system 310 with scintillator 302, photodetector 304 and electronics 306, for example as configured to perform pulse-shape discrimination. In this particular embodiment, a photomultiplier tube (PMT) or multi-pixel photon counter (MPPC) type photodetector 304 is positioned to receive luminescence generated by a scintillating material 302 via a substantially direct optical coupling. Alternatively, a light pipe, optical fiber or other coupling may be used.

Photon detector 302 is configured to generate an electronic signal in response to the luminescence generated by the passage of ionizing radiation through scintillator 302. Electronics 306 is coupled to detector 304 in order to receive the electronic signal, and to process the signal in order to detect and identify sources of ionizing radiation. Electronics 306 can also be configured to discriminate between particle types based on the pulse shape of the electronic signal, as described above, based on the temporal signature of the relative fast and slow luminescence components.

DETAILED DESCRIPTION

Figure 1:
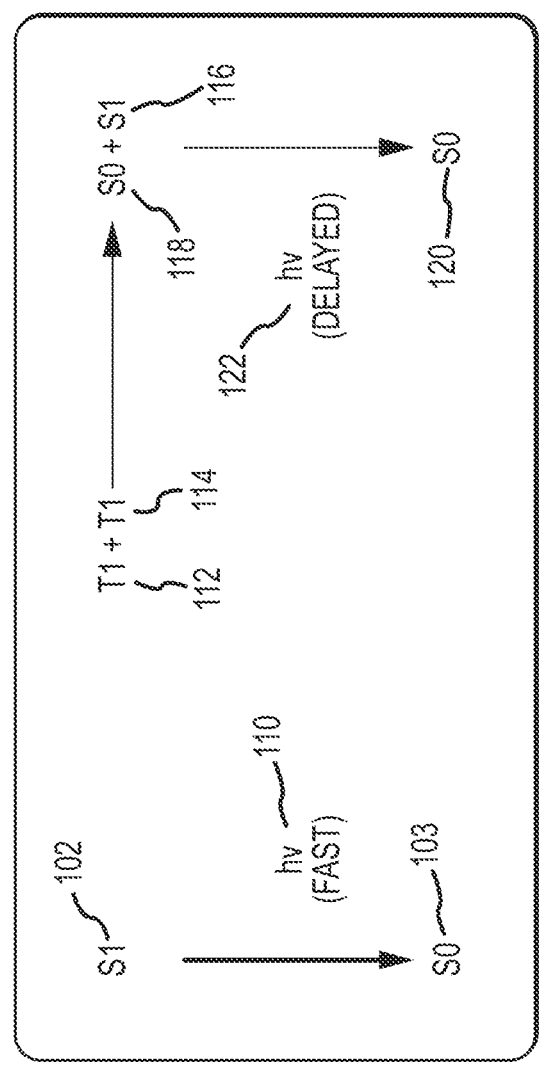
FIG. 1 is a schematic illustration of transitions experienced by excited electrons, as known in the art.

Certain details are set forth herein to provide a sufficient understanding of embodiments of the invention. However, it will be clear to one skilled in the art that embodiments of the invention may be practiced without various of these particular details. In some instances, well-known chemical structures, chemical components, molecules, materials, electronic components, circuits, control signals, timing protocols, and software operations have not been shown in detail in order to avoid unnecessarily obscuring the described embodiments of the invention. Further, examples may be described below in the context of subatomic particle detection and/or discrimination, such as between electrons and/or gamma rays and protons and/or neutrons.

Crystals of aromatic organic molecules scintillate in response to the passage of ionizing radiation, and provide for discrimination between fast neutrons and gamma ray events according to the observed pulse shape distribution. Current organic materials, however, may be of limited practical use in particle discrimination and source identification, due to their brittle mechanical properties associated with low-symmetry (monoclinic) crystalline structures, and limited control over the observed intermolecular interactions and chromophore spacing.

Examples described herein can address these limitations by providing higher-order (non-monoclinic, e.g., trigonal, hexagonal, orthorhombic, tetragonal, or cubic) organic scintillators. Examples described include synthetic modification of molecular and crystalline symmetries of luminescent organic molecules. Bottom-up synthetic approaches may be employed to increase the symmetry of the crystalline structures, which may result in improved mechanical properties, enhanced triplet mobility rates, and/or fast neutron discrimination capabilities. Some examples of techniques described herein are also described in "Pulse-Shape Discrimination in High-Symmetry Organic Scintillators" by Patrick L. Feng and Michael E. Foster, IEEE Transactions on Nuclear Science, Vol. 60, No. 4, pp. 3142-3149, the entirety of which is hereby incorporated by reference for any purpose.

While 1,3,5-triphenylbenzene crystals are known to be orthorhombic (space group Pna21), other conventional organic scintillating materials have a monoclinic crystalline structure. This low-symmetry crystalline structure results in preferential propagation of effects along planes of the crystal, which may adversely affect the performance of the scintillator. Moreover, monoclinic scintillating materials generally include repeating stacks of molecules, which may have poor mechanical (e.g., stress dissipation and fracture) properties.

TABLE I

CRYSTALLOGRAPHIC PARAMETERS
FOR CRYSTALLINE ORGANIC SCINTILLATORS

| Crystal Name | Crystal System | Space Group |
| --- | --- | --- |
| Anthracene | Monoclinic | $P2_1/a$ |
| trans-stilbene | Monoclinic | $P2_1/a$ |
| p-terphenyl | Monoclinic | $P2_1/a$ |
| Naphthalene | Monoclinic | $P2_1/a$ |
| Diphenylacetylene | Monoclinic | $P2_1/a$ |
| 9,10-diphenylanthracene | Monoclinic | $P2/m$ |

TABLE I-continued

CRYSTALLOGRAPHIC PARAMETERS
FOR CRYSTALLINE ORGANIC SCINTILLATORS

| Crystal Name | Crystal System | Space Group |
| --- | --- | --- |
| 1,1,4,4-tetraphenil-1,3-butadiene | Monoclinic | $P2_1/c$ |
| 2,4-diphenyloxazole | Monoclinic | $P2_1/n$ |
| 1,4-diphenyl-1,3-butadiene | Monoclinic | $P2_1/n$ |
| ammonium salicylate | Monoclinic | $P2_1/n$ |
| salicylic acid | Monoclinic | $P2_1/a$ |
| 1,3,5-triphenylbenzene | Orthorhombic | Pna21 |

Figure 4:
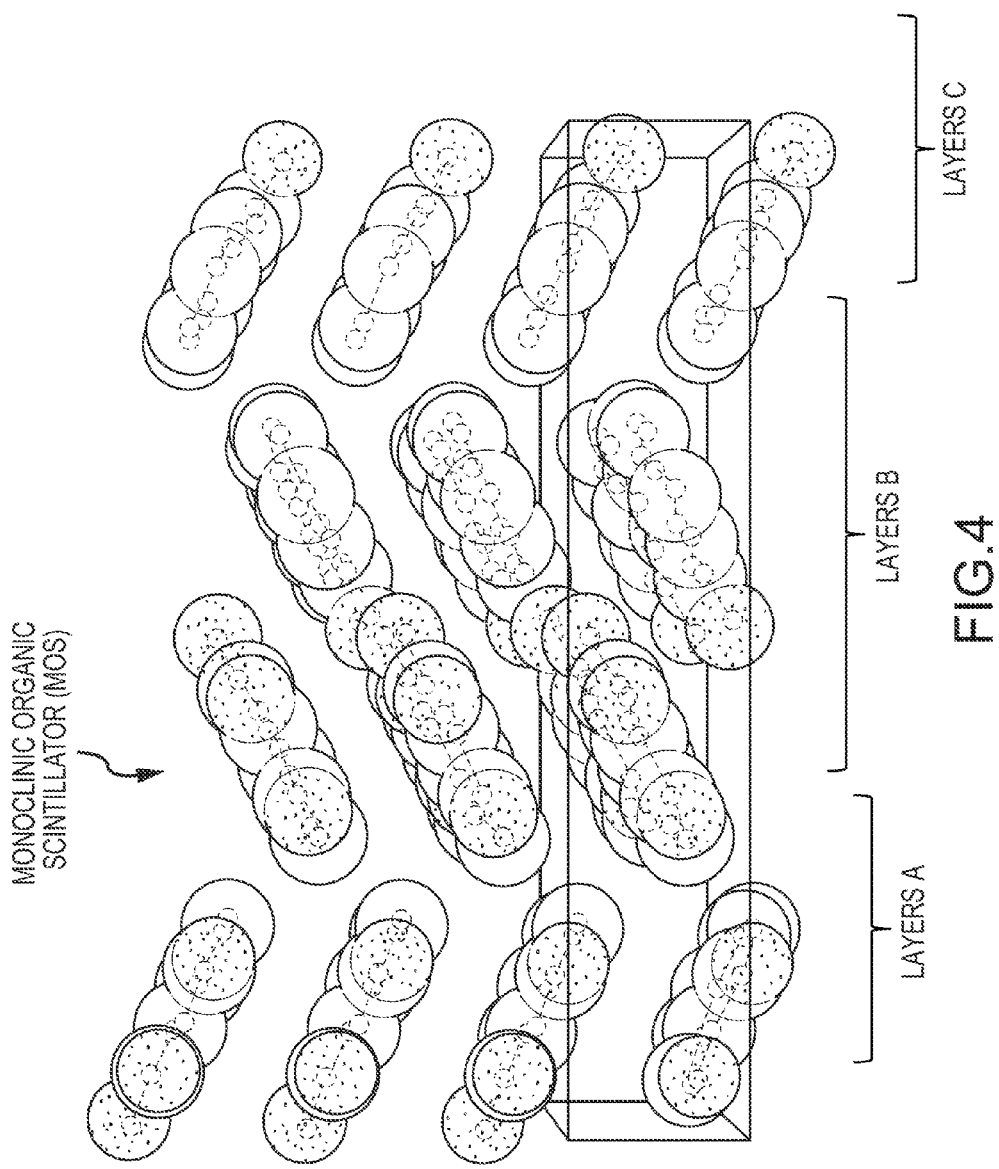
FIG. 4 is an illustration of a representative double-herringbone layered structure for a monoclinic organic scintillator.

FIG. 4 is an illustration of a representative double-herringbone layered structure for a monoclinic organic scintillator (MOS), for example salicylic acid. Other organic scintillators can also crystallize in low-symmetry, monoclinic space groups, for example as shown in Table I.

As shown in FIG. 4, monoclinic organic scintillators typically possess a series of layers A, B, C, etc., which may form a herringbone or double-herringbone packing arrangement. Thus structure tends to constrain the inter-chromophore distances and orientations to a particular (single) type.

Existing monoclinic crystalline organic scintillators tend to form fragile materials, for example due to susceptibility to thermally or mechanically-induced shear fracture along the basal cleavage plane of the crystal. Examples of high-symmetry (e.g. cubic and above) crystalline organic scintillators described herein may have improved properties over monoclinic crystalline structures including, but not limited to, improvements in strain performance, thermal expansion coefficient, light yield anisotropy, or transport mobility. These properties may improve scintillator system performance in some examples.

Accordingly, examples described herein include high-symmetry (e.g. cubic) organic scintillators. High-symmetry refers to crystalline structures that possess a larger number and diversity of symmetry elements than monoclinic space groups. All crystalline materials will belong to one of seven crystal systems, which comprise triclinic, monoclinic, orthorhombic, tetragonal, trigonal, hexagonal, and cubic. High-symmetry generally refers to crystalline systems other than triclinic and monoclinic. Low-symmetry generally refers to triclinic and monoclinic symmetries.

Examples of organic scintillators are described herein. Organic scintillators generally refer to aromatic hydrocarbon compounds which may include linked benzene ring structures, and other organic materials that generate luminescence, fluorescence, or other photon signals in response to ionizing radiation. Scintillators generally refer to materials and compounds that exhibit luminescence, fluorescence, or other light emission when excited by ionizing radiation, for example a scintillating material, scintillating compound or other medium in which ionizing particles excite atoms or molecules into excited states that emit light when they decay. Scintillating moieties refer to the active chromophores or fluorophores within a scintillating material or scintillating compound, which emit light (photons) when they decay from the excited states. The scintillators may be provided in a single crystal form, polycrystalline form, powder form, or combinations thereof. In some examples, the scintillating materials may be suspended or otherwise provided in a liquid.

Examples of high-symmetry organic scintillators described herein include organic molecular compounds having three-fold or higher symmetry (e.g., $C_3$-symmetric). The compounds include molecules having three-fold or higher symmetry which may have a center moiety (e.g. an atom) that is selected to enforce three-fold or greater molecular symmetry. Generally, the center moiety may be implemented using an atom or other chemical structure that, for enforcing three-fold symmetry, forms chemical bonds which are oriented in a tetrahedral, trigonal pyramidal, trigonal planar, or octahedral geometry. Examples of atoms suitable for use in implementing the center moiety include, but are not limited to, nitrogen, phosphorous, carbon, silicon, and germanium. Examples of groups suitable for use as the center moiety include, but are not limited to, amine, phosphine, benzene, truxene, triphenylene, and 1,3,5-triphenylbenzene.

Examples of high-symmetry organic scintillators described herein may include scintillating moieties attached to (e.g., functionalized with) the center moiety. Scintillating moieties generally are organic molecules having scintillating properties. Scintillating moieties may be attached to three, or four, or six bonds provided by the center moiety to form a $C_3$-symmetric structure. Examples of scintillating moieties include, but are not limited to, pendant biphenyl, salicylate, naphthalene, anthracene, trans-stilbene, 2,5-diphenyloxazole, or p-terphenyl groups. Attachment may be made using any of a variety of synthesis techniques including, but not limited to, condensation, nucleophilic substitution, and Suzuki coupling reactions. The molecules having a center moiety and scintillating moieties may accordingly form high-symmetry crystalline structures. The formation of the high-symmetry crystalline structures may be in part dictated by the structure and point-group symmetry of the center moiety. For example, three-fold rotationally symmetric molecules may be synthesized having a center moiety and attached scintillating moieties. These $C_3$-symmetric molecules may then form cubic crystals due to the presence of the required symmetry elements in this high-symmetry crystal system.

The molecular structures of high-symmetry organic scintillators (e.g. $C_3$-symmetric organic materials) represent a useful structural motif in some examples, due to the synthetic flexibility enabled by this platform. Improved pulse-shape discrimination (PSD) capabilities may be realized in these materials, relative to low-symmetry crystals of the parent chromophores, including improvement in the PSD figure of merit for high-symmetry salicylate-based scintillator materials, and other scintillating compounds and media with order of symmetry greater than monoclinic. Examples of high-symmetry organic scintillators described herein further include $C_3$-symmetric molecules that crystallize in a diversity of high-symmetry space groups that include cubic structures.

For PSD, the figure of merit (FOM) can typically be expressed in terms of a ratio between the peak separation and the sum of the centroid positions. Thus, a higher FOM indicates better particle discrimination, for example with FOM≥1.2 or FOM>1.2 (or some other threshold value FOM>T) defined to demonstrate that a particular system has "good" or effective pulse-shape discrimination capability. A PSD-FOM of 1.2 is shown to represent efficient particle discrimination capabilities for a given minimum energy detection threshold.

In one particular example, a relatively low pulse-shape discrimination FOM value of about 0.5 is obtained for crystals of (monoclinic) ammonium salicylate, whereas a nearly five-fold improvement is obtained in crystals of (hexagonal) tris(methylsalicylate)amine, with pulse-shape discrimination FOM of about 2.3. This observation is associated with improved transport mobility and three-dimensional triplet diffusion in higher-order crystalline structures, a property that serves as a basis for triplet-triplet annihilation and improved pulse-shape discrimination. Existing (low-symmetry) crystalline scintillators, on the other hand, may be limited to planar transport in two dimensions, due to their layered monoclinic structures.

The mechanical and optical properties of organic scintillators can also be improved via crystal engineering. Low-symmetry structures, for example, may lead to highly anisotropic light yields and thermal expansion coefficients, as well as a propensity for shear fracture along the basal packing planes. These physical properties are controlled by second-rank tensors, which are directly associated with the crystalline symmetry.

In one embodiment, the high-symmetry crystal structure of a cubic scintillator such as tris(2-naphthyl)amine perchlorate results in more isotropic optical and mechanical properties. Optical isotropy and the increased number of independent slip systems in such high-symmetry structures also enable simplified, rapid crystal growth processes, as well as improved mechanical consolidation into transparent polycrystalline bodies for use in a variety of organic scintillator detector designs.

Examples

Figure 5B:
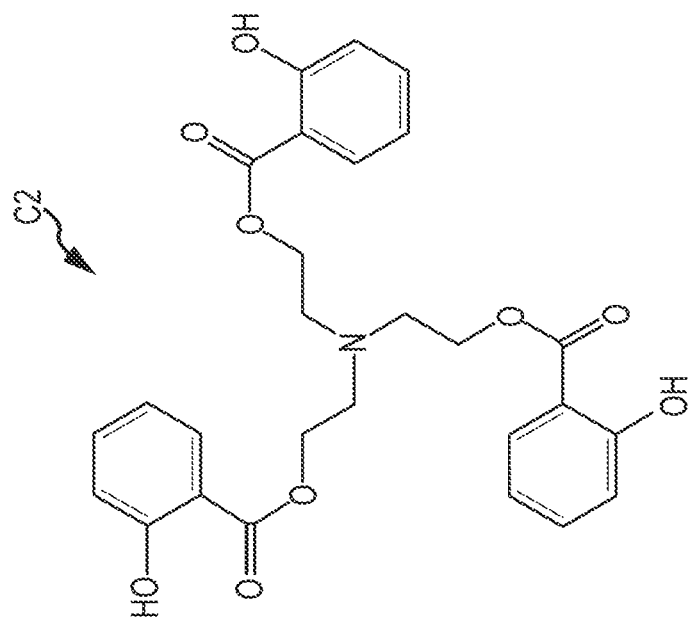
FIGS. 5A and 5B illustrate representative molecular structures for high-symmetry organic compounds in accordance with examples of the present invention.
Figure 5A:
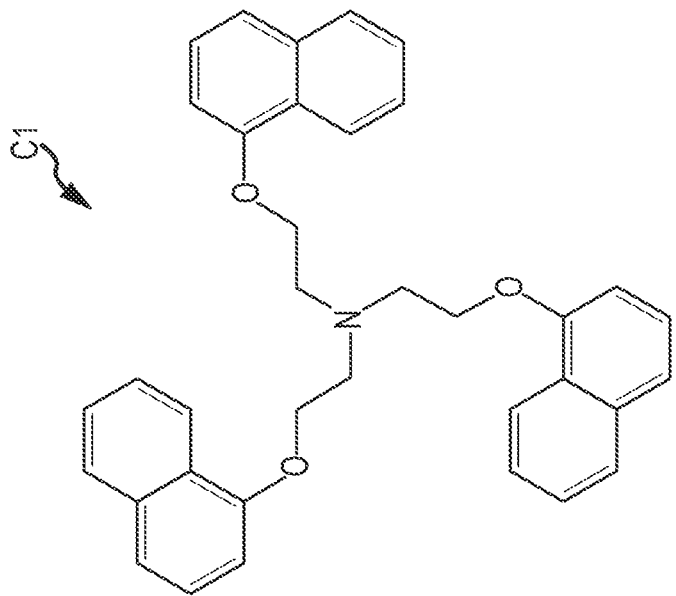

FIGS. 5A and 5B illustrate the molecular structures for representative high-symmetry organic compounds C1 (left) and C3 (right), for example organic scintillator compounds including organic fluorescent or luminescent moieties. To enable pulse-shape discrimination in these compounds, note that increased crystalline symmetry alone does not necessarily guarantee an improvement in the triplet transport rate. Instead, a previously unexplored route is described, toward the modulation of structural, photophysical, and transport properties of crystalline organic scintillators.

In one example, cubic (e.g. $C_3$-symmetric) compounds based on the chromophores naphthalene and salicylate (e.g. as scintillating moieties) are selected for reasons involving ease of synthesis and purification of the targeted compounds. Another consideration stems from the lack of significant pulse-shape discrimination from crystals of either of the parent chromophores, which allows for straightforward comparison to the particle discrimination performance of the synthesized compounds, as assessed by the "turning on" of pulse-shape discrimination.

Experimental reagents are obtained in high purity, e.g., from Sigma-Aldrich of Saint Louis, Mo. Reference crystals including trans-stilbene, naphthalene, and salicylic acid are recrystallized from scintillation grade or ≥99% purity starting materials. Single crystals are grown at room-temperature using acetone/hexane and ethyl acetate/hexane solvent-diffusion methods, for example over a period of about three weeks.

In some examples, tris(1-naphthyloxy)triethylamine (compound C1) is synthesized via nucleophilic substitution of 2-naphthol and tris(2-chloroethyl)amine hydrochloride in methanol. Light brown crystals are obtained from an ethyl acetate/ethanol mixture at room temperature, for example over a period of about one week. The colored crystals are dissolved in acetone and passed through a neutral alumina column to remove impurities, including highly absorptive impurities such as naphthoquinone oxidation impurities. The acetone solution of compound C1 is concentrated and cooled, resulting in colorless crystals that are isolated and recrystallized once further, from a chloroform/methanol mixture.

High-performance liquid chromatography-mass spectrometry (LC-MS) is used to confirm the purity of the obtained crystals to greater than 99.9%. In one application, a transparent and colorless crystal with representative dimensions of about 12×15×20 mm is used for photoluminescence and scintillation measurements.

In some examples, tris(1-naphthyloxy)triethylamine perchlorate (compound C2) is synthesized by refluxing an acetone solution of compound C1 with manganese (II) perchlorate hydrate. The microcrystalline precipitate is isolated and washed with acetone to remove unreacted reagents. Colorless pyramidal single crystals are obtained via slow diffusion of diethyl ether into a saturated N,N-dimethylformamide solution, for example over a period of about five days.

In some examples, tris(2-hydroxybenzoyloxy)triethylamine (compound C3) is synthesized via a trans-esterification reaction between methyl 2-hydroxybenzoate and triethanolamine. Compound C3 is isolated from the crude reaction mixture via column chromatography on silica, for example using a mixture of about 9:1 toluene:ethyl acetate. The purified fractions are combined and evaporated to yield a colorless oil of compound C3. In one application, colorless single crystals of up to about 10×12×15 mm are obtained, for example over a period of about two weeks from an acetone/hexane solution at about −40 C. The purity of the crystals used for photoluminescence and scintillation measurements may be confirmed using LC-MS.

Steady-state photoluminescence (PL) spectra are obtained using a suitable discriminator, spectrometer or other photon detection and analysis system sensitive to the intensity and wavelength distribution of the emission spectrum, for example a FL3-21 model fluorometer from Horiba Jobin-Yvon Fluorolog of Edison, N.J. Time-resolved PL measurements can be made using a suitable light source, for example a 341 nm pulsed LED operated at 500 kHz. In one particular example, scintillation timing distributions are obtained for gamma rays (γ-rays) from a radioactive source such as $^{137}Cs$, using the method of time-correlated single-photon counting (TCSPC).

Photomultiplier tubes (PMTs) or other suitable photon detectors are used to provide the scintillation trigger and single-photon stop pulses, for example model R1828-01 and R7207-01 PMTs from Hamamatsu Photonics of Hamamatsu City, Japan. The delay times between pulses are distributed in histograms to obtain scintillation decay curves, as described herein (see, e.g., FIGS. 7 and 8). Pulse-shape discrimination measurements of fast neutrons and gamma rays are also performed, for example using an unmoderated AmBe source (or other source of ionizing radiation) and a suitable photon detector (e.g., a Hamamatsu R2059 PMT operated at 2000 V). The resulting signal pulses are digitized using a suitable fast digital processing system, for example a 12-bit HRO66Zi digital oscilloscope as available from Teledyne LeCroy of Chestnut Ridge, N.Y.

The resulting digital waveforms can be post-processed according to different methods including, but not limited to, pulse height vs. area and charge-comparison PSD. The charge comparison method, for example, is accomplished by integration over two different time intervals, $t_{delayed}$ and $t_{total}$, and plotting the corresponding ratios of charge delayed $Q_{delayed}/Q_{total}$, as described below. Pulse height measurements are obtained for single crystals of similar volume (e.g., on the order of ~2 $cm^3$) using a suitable photon detector, for example a Hamamatsu H6610 PMT biased at −1600 V. The detector output can be directly connected to a digital oscilloscope or other digitizing system, with pulse heights and areas derived from offline charge integration of the stored waveforms. Alternatively, a combination of preamplifier and suitable amplifier circuitry may be utilized, for example to increase signal size or to provide pulse shaping for subsequent particle discrimination and spectrum analysis functionality.

Example Results

A. Structural Considerations

Figure 2:
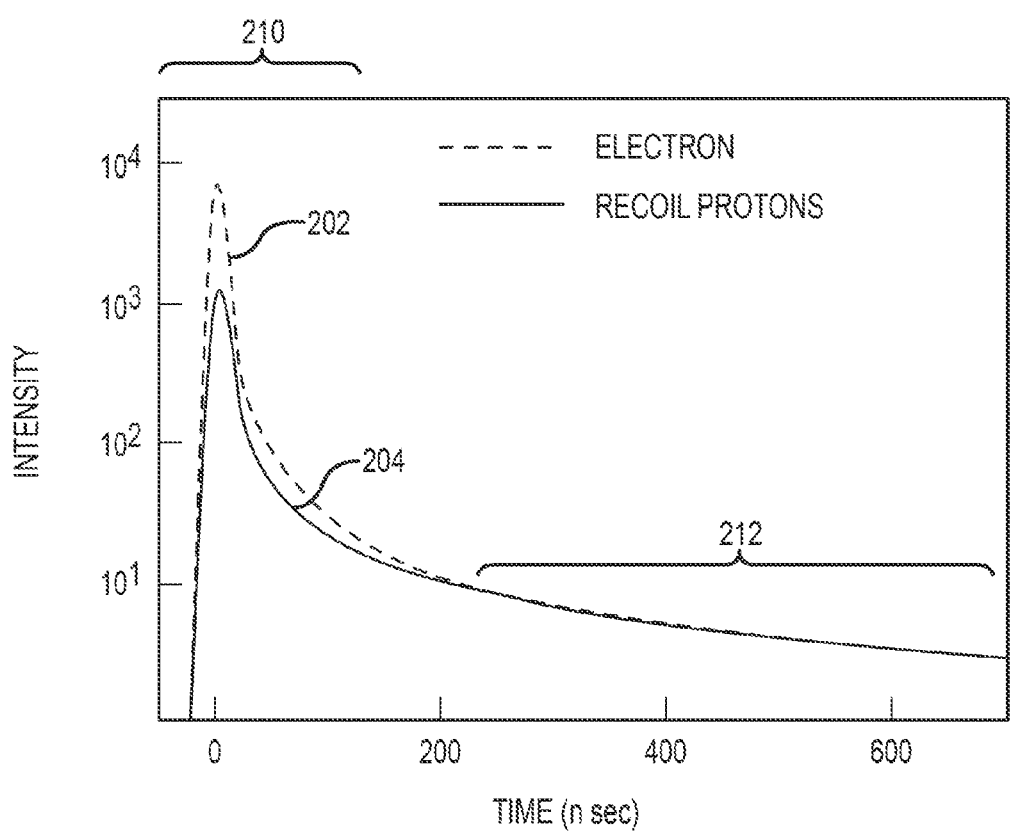
FIG. 2 is a schematic illustration of the intensity of luminescence generated by ionizing electrons and recoil protons, respectively, over time.

The molecular structures of compounds C1 and C3 (see FIG. 2) illustrate the substitution of scintillating moieties (e.g. pendant chromophore molecules) to a center moiety (e.g. a central amine core structure). This representation describes a structure of the scintillator, for which variations in the electronic properties of the chromophore may impact the luminescence properties.

TABLE II

SYNTHESIZED COMPOUNDS
AND CRYSTALLOGRAPIC SPACE GROUPS

| Compound Name | Crystal System | Space Group |
|---|---|---|
| tris(1-naphthyloxy)triethylamine (C1) | Rhombohedral | R-3 |
| tris(1-naphthyloxy)triethylamine perchlorate (C2) | Cubic | P2(1)3 |
| tris(1-naphthyloxy)triethylamine nitrate | Cubic | P2(1)3 |
| tris(1-phenoxy)triethylamine | Rhombohedral | R3c |
| tris-1-(4-bromophenoxy)triethylamine | Rhombohedral | R-3 |
| [tris(1-phenyloxy)triethylamine] perchlorate | Rhombohedral | R3c |
| tris-1-(biphenyloxy)triethylamine | Rhombohedral | R-3 |
| tris(2-hydroxybenzoyloxy)triethylamine (C3) | Orthorhombic | C222 |
| tris(dihydronaphthodioxin)phosphine oxide | Orthorhombic | P212121 |
| tris(dihydronaphthodioxin)phosphine oxide | Cubic | Pa-3 |
| tris(9-anthracenyl)phosphine | Rhombohedral | R-3 |
| tris(1-naphthyl)phosphite | Orthorhombic | Pnma |
| 1,3,5-tris(biphenyl)benzene | Rhombohedral | R-3c |
| (4-bromo)hexaethyltruxene | Cubic | Pa-3 |
| hexabenzyltruxene | Rhombohedral | R-3 |
| tris(dimesitylboryl)hexaethyltruxene | Cubic | I-43d |
| hexapropyloxytriphenylene | Cubic | Fd-3c |

Figure 6:
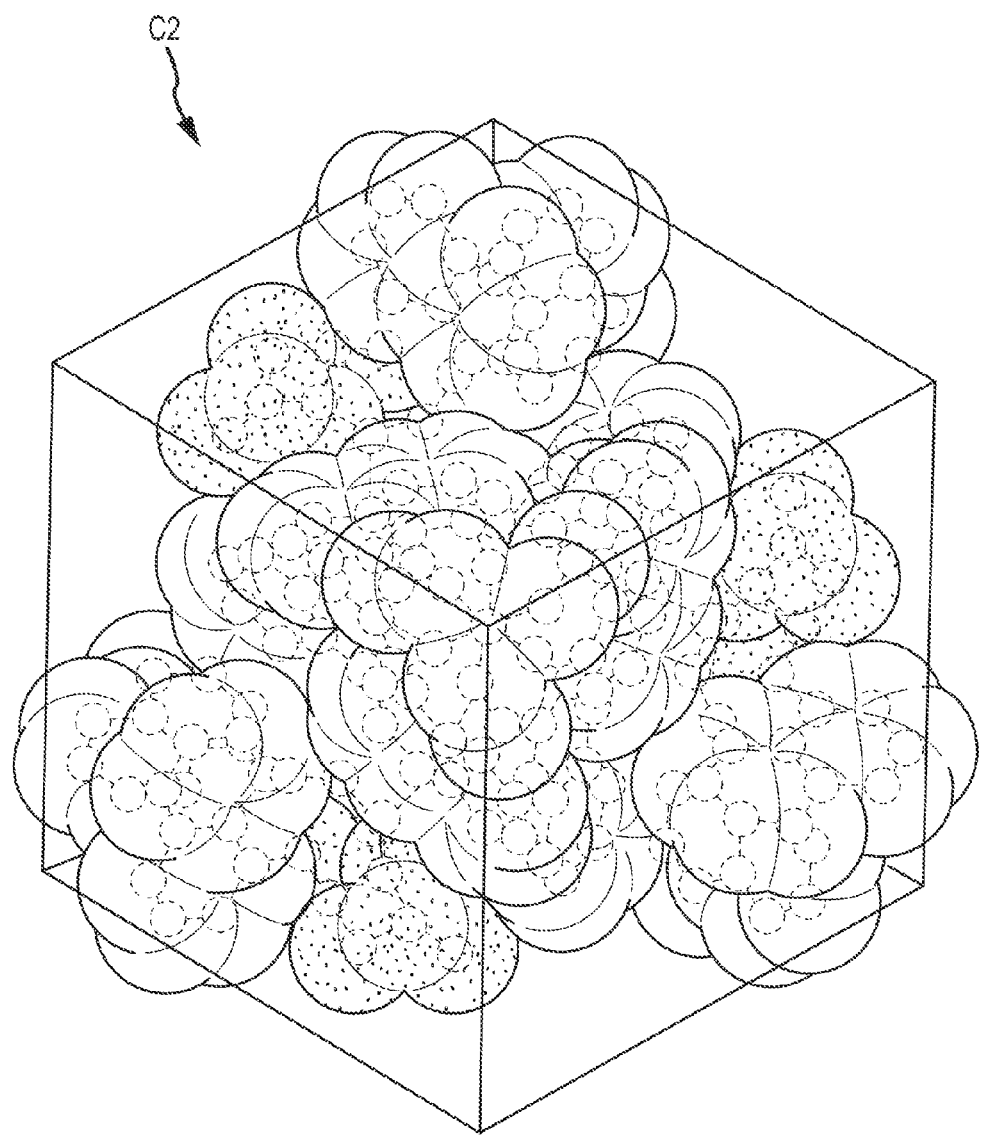
FIG. 6 is an illustration of crystallographic packing for the cubic structure of a representative high-symmetry organic compound, viewed along the $C_3$-symmetric axis in accordance with examples of the present invention.

FIG. 6 is an illustration of crystallographic packing for the cubic structure of a representative high-symmetry organic compound C2, viewed along the $C_3$-symmetric [111] axis. Previous studies of PSD in organic materials were limited to the electronic effects of π-conjugation, and did not consider the intermolecular effects of crystallographic packing.

Table II provides a description of the crystallographic parameters for compounds C1, C2, and C3, and for five other compounds that may be synthesized according to the approaches described herein. Known organic scintillators generally consist of single-chromophore molecules, for which the secondary and tertiary structures are essentially the same. For examples of compounds described herein, the secondary structure may provide a description of the intramolecular orientations of scintillating moieties (e.g. pendant groups), whereas the tertiary structure controls the extent of intermolecular interactions.

B. Density-Functional Theory (DFT) Calculations

Electronic coupling for the triplet excitation energy transfer (TEET) process may be calculated for several dimer configurations of naphthalene and compound C1 using density function theory (DFT) methods, for example a constrained density functional theory (CDFT) approach described by Yeganeh and Van Voorhis. The magnitudes of these coupling interactions may be relevant in some examples due to correlations with the triplet migration efficiency, the rate of triplet-triplet annihilation, and the particle discrimination efficiency via pulse-shape discrimination.

Calculations are performed using range-separated or long-range corrected (LC) functional, for example a CAM-B3LYP functional as described by Yanai, Tew, and Handy, using a 6-311G(d,p) basis set within a NWChem 6.1.1 package, an open-source computational chemistry package available from the Environmental Molecular Sciences Laboratory, located at the Pacific Northwest National Laboratory in Richland, Wash. Atomic coordinates may be derived from the crystallographic data to assess the magnitude of triplet-triplet interactions for different molecular configurations. Diabatic states needed to calculate the electronic coupling for the triplet excitation energy transfer process may be obtained by constraining the triplet spin state to each monomer within the dimer.

Figure 7:
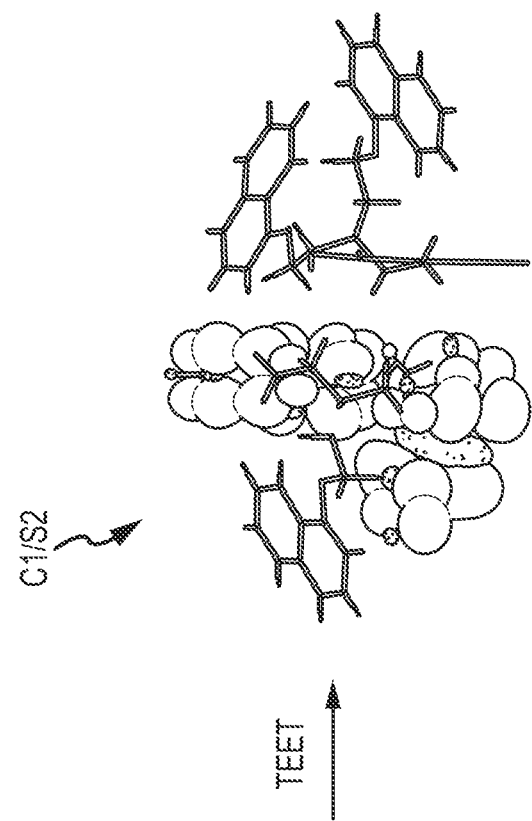
FIG. 7 is an illustration of spin density and triplet excitation energy transfer for a representative high-symmetry organic compound, showing initial and final diabatic triplet states in accordance with examples of the present invention.
Figure 7:
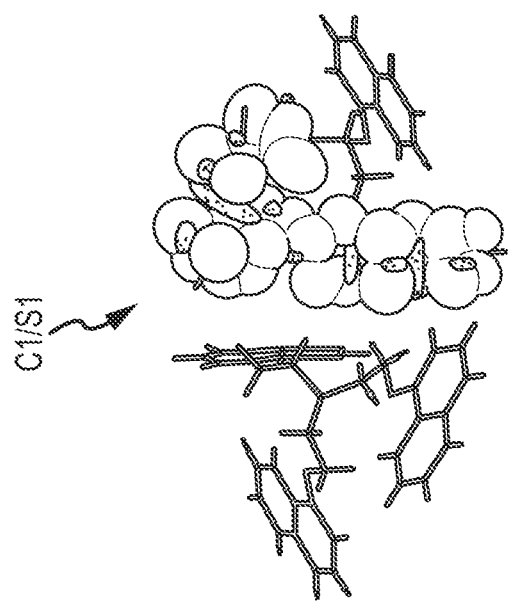

FIG. 7 is an illustration of spin density and triplet excitation energy transfer for representative high-symmetry organic compound C1. In some examples, the initial (left) and final (right) diabatic triplet states S1 and S2 may be determined using constrained density functional theory. The spin densities of the two triplet excited states are shown for the dimer 1 configuration of compound C1, illustrating the localization of triplet states on respective monomers following triplet excitation energy transfer (TEET).

The electronic matrix coupling $V_{if}$ element can be directly computed from the two diabatic states as follows:

$$V_{if} = \frac{H_{if} - S_{if}(\varepsilon_i + \varepsilon_f)/2}{1 - S_{if}^2}, \quad (1)$$

where $\varepsilon_i$ and $\varepsilon_f$ are the initial and final diabatic state energies, respectively. The state coupling ($H_{if}$) and overlap ($S_{if}$) are defined by $$H_{if} = \langle DA^3|\hat{H}|D^3A \rangle, \text{ and} \quad (2)$$

$$S_{if} = \langle DA^3|D^3A \rangle, \quad (3)$$

where $\hat{H}$ is the electronic Hamiltonian. The state vectors $\langle DA^3|$ and $|D^3A\rangle$ represent the initial (or donor) and final (or acceptor) triple-state wave functions, respectively.

Figure 8:
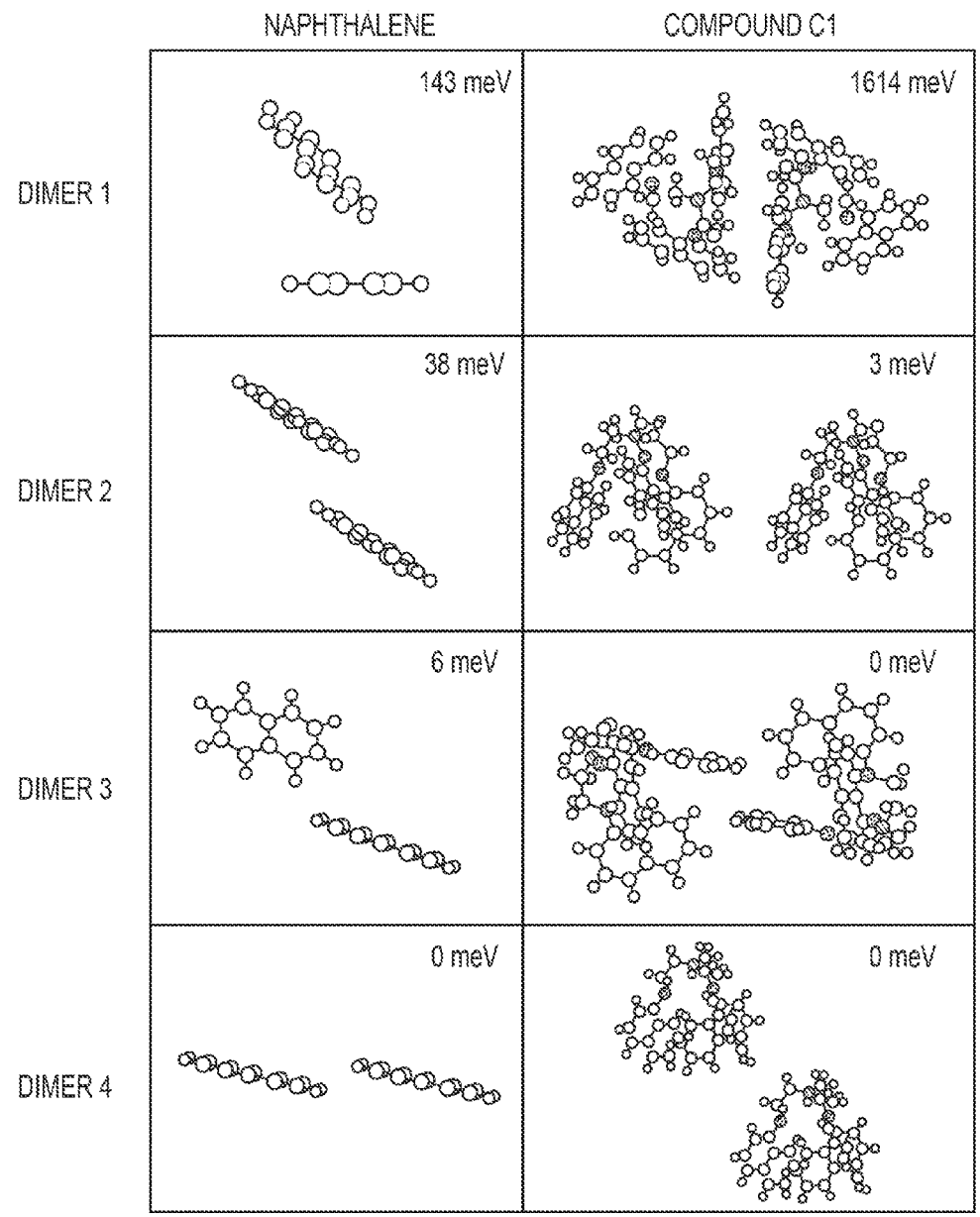
FIG. 8 is a chart of intermolecular configurations observed in the crystal structures of naphthalene and a representative high-symmetry organic compound, with triplet electronic coupling interaction values in accordance with examples of the present invention.

FIG. 8 is a chart of different intermolecular configurations observed in the crystal structures of naphthalene (left) and representative high-symmetry organic compound C1 (right). Corresponding triplet electronic coupling interaction values are provided as insets, for example as obtained by density-functional theory calculation.

The four nearest-neighbor orientations for naphthalene and compound C1 are illustrated in the left and right panels of FIG. 8, respectively, along with the calculated values for triplet electronic coupling interactions. These data indicate that the magnitude of triplet exchange is controlled at least in part by the spatial and symmetry properties of the crystal. Stronger exchange interactions are indicated for the dimer 1 arrangement of compound C1, for which the coupling constant is 1614 meV. This is more than an order of magnitude larger than the corresponding coupling constant in naphthalene, in consideration of the closer interaction pathways and more favorable geometric arrangement of chromophores in compound C1, for example.

C. Steady-State Photoluminescence

Compounds C1, C2 and C3 possess C3-symmetric secondary structures, arising from a trigonal pyramidal coordination environment around the central moiety (e.g. nitrogen atom). The tertiary structures of compounds C1, C2 and C3 provide an additional handle from which to modify the bulk symmetry and consequent photophysical and mechanical properties.

Indeed, modifying the arrangement of chromophore molecules with respect to one another may have direct implications for the observed photophysical properties. Such effects include large Stokes shifts and excimer formation in fused aromatic chromophores such as pyrene, and enhanced fluorescence quantum yields in crystals of linearly conjugated compounds such as trans-stilbene. These observations may be attributed to strong intermolecular interactions and decreased rotational deactivation pathways, respectively.

Figure 9A:
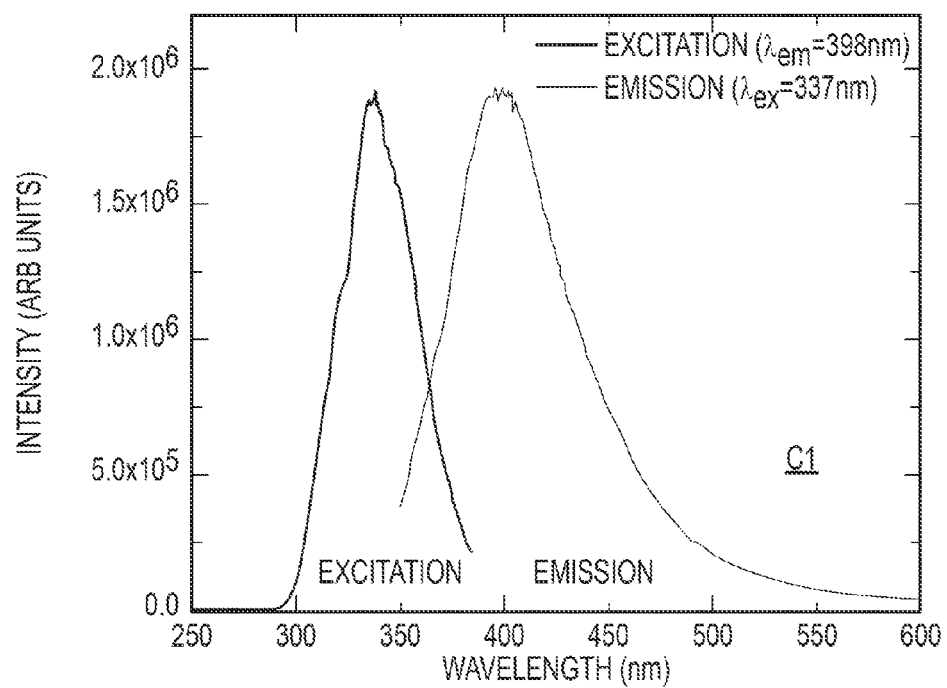
FIGS. 9A and 9B are photoluminescence excitation and emission spectra for selected low-symmetry organic compounds.
Figure 9B:
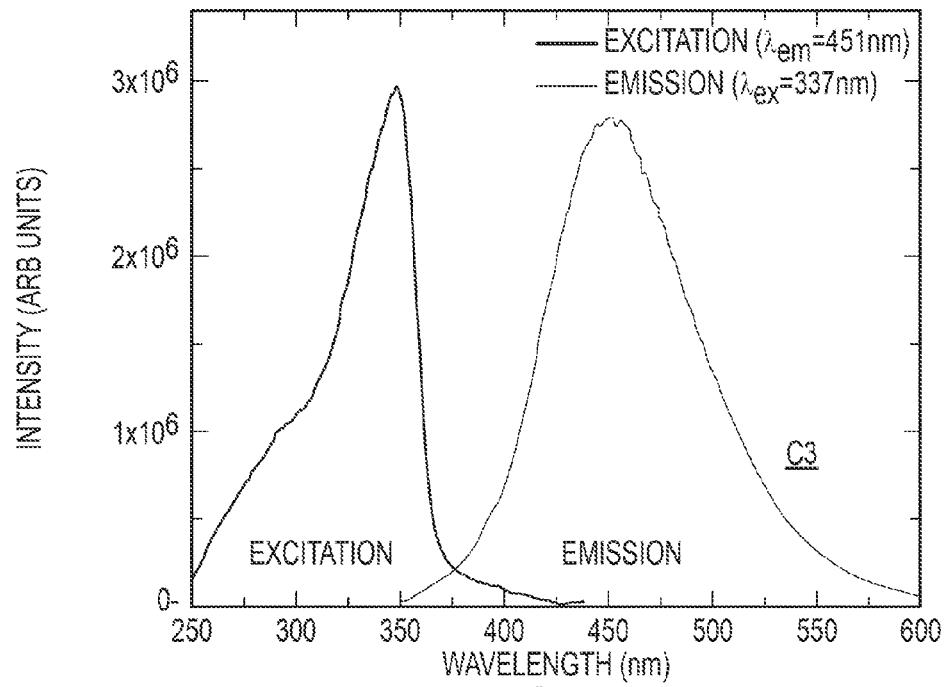

FIGS. 9A and 9B are plots of photoluminescence excitation and emission spectra for representative high-symmetry organic compounds C1 and C3, respectively. Intensity is plotted on the vertical axis, in arbitrary units. Photon wavelength is plotted on the horizontal axis, in nanometers (nm). Similar observations are evident in the photoluminescence (PL) spectra for compounds C1, C2, and C3, for which red-shifted and broadened emission spectra are apparent.

The insets identify the respective excitation (left) and emission (right) curves, with the quantities in parenthesis referring to the wavelength at which each curve is obtained. For example, the left-hand traces correspond to excitation curves obtained when the emission monochromator is fixed at the indicated wavelength $\lambda_{em}$, and the excitation monochromator wavelength is varied. The right-hand traces correspond to the emission curves obtained when the excitation monochromator is fixed at the indicated wavelength $\lambda_{ex}$, and the emission monochromator wavelength is varied.

As shown in FIG. 9A, the photoluminescence spectra for compound C1 reveal a deep blue luminescence emission spectrum peaked at about $\lambda_{em} \approx 398$ nm, with a Stokes shift of about $\Delta\lambda \approx 61$ nm from the corresponding excitation peak at about $\lambda_{ex} \approx 337$ nm. These emission characteristics are markedly different from other organic materials such as naphthalene, for example as indicated by a red shift of about $\Delta\lambda \approx 80$ nm and a lack of vibronic fine structure (FS) in the emission spectrum. These observations may be consistent with density-functional theory calculations that indicate significantly stronger intermolecular interactions in compound C1, as compared to other, lower-symmetry organic materials. A moderate amount of spectral overlap is observed between the excitation and emission spectra in the region of about $\lambda \approx 340$ nm to about $\lambda \approx 400$ nm, which may be similar in magnitude to that of traditional scintillators such as trans-stilbene.

The photoluminescence spectra reveal a substantially smaller degree or amount of luminescence self-absorption for compound C3 (FIG. 9B), for example due to intramolecular hydrogen bonding interactions within each methyl salicylate moiety. These interactions contribute to an appreciable red-shift of the emission maximum to about $\lambda_{em} \approx 451$ nm, and a correspondingly large Stokes shift of about $\Delta\lambda \approx 115$ nm, as compared to the corresponding excitation peak at about $\lambda_{ex} \approx 337$ nm. The extent of overlap between the excitation and emission spectra for compound C3 is less than that of compound C1, and less than about 2% of the integrated area for each of the excitation and emission spectra.

D. Timing Measurements

Figure 10A:
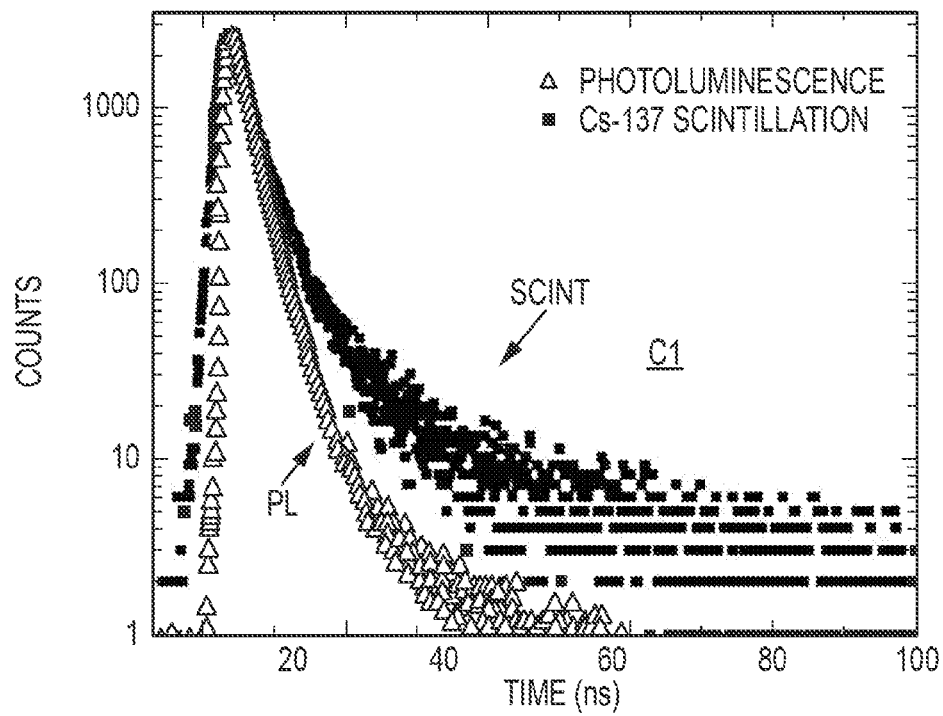
FIGS. 10A and 10B are photoluminescence and scintillation decay curves for representative high-symmetry organic compounds in accordance with examples of the present invention.
Figure 10B:
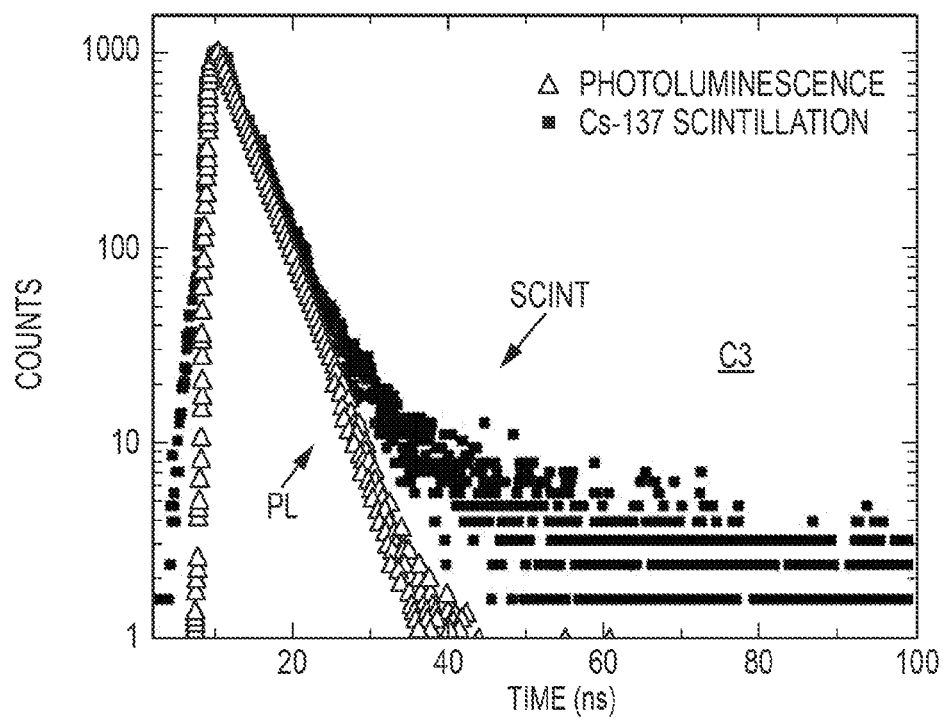

FIGS. 10A and 10B are photoluminescence and scintillation decay curves for representative high-symmetry organic compounds C1 and C3, respectively. The excitation wavelength is about $\lambda_{ex} \approx 337$ nm, as described above for FIGS. 9A and 9B. The number of counts is indicated on the vertical axis, with arbitrary scaling. Time is shown on the horizontal, for example over a 100 nanosecond (100 ns) interval. The time scale and count rates may vary, however, based on detector configuration, electronics and other considerations.

Photoluminescence and scintillation timing measurements are performed using time-correlated single photon counting (TCSPC). The photoluminescence curve (PL) for compound C1 (FIG. 10A) is well fit to a bi-exponential process, with emission lifetimes of about $\tau_1 \approx 2.5$ ns (94% contribution) and about $t_2 \approx 10.4$ ns (6% contribution). The corresponding $^{137}$Cs scintillation decay curve (SCINT) exhibits more complex decay kinetics, characteristic of delayed fluorescence via triplet-triplet annihilation. This delayed fluorescence may in some examples not be adequately described by any number of exponential processes, and is consistent with a dispersive mechanism for triplet-triplet annihilation, as may be observed in other crystalline organic scintillators.

Qualitatively similar behavior is observed for compound C3, with the exception of mono-exponential photoluminescence decay characteristics ($\tau_1 \approx 4.3$ ns). The observed scintillation decay rates for these synthesized $C_3$-symmetric compounds may be substantially faster than for the parent chromophores, and comparable to that of some liquid scintillators, for example BC-501 liquid scintillator as available from Saint-Gobain Crystals of Hiram, Ohio, in some examples.

The dominant fluorescence decay component for existing naphthalene single crystals may be about 78 ns, which compares to about 2.5 ns for compound C1 and about 2.2 ns for compound C2. Decay kinetics for the delayed fluorescence component may also be relevant, corresponding to a transport-mediated process resulting in a power-law decay mechanism that may ultimately limit the maximum count rate of organic-based scintillator materials in some examples.

Figure 11:
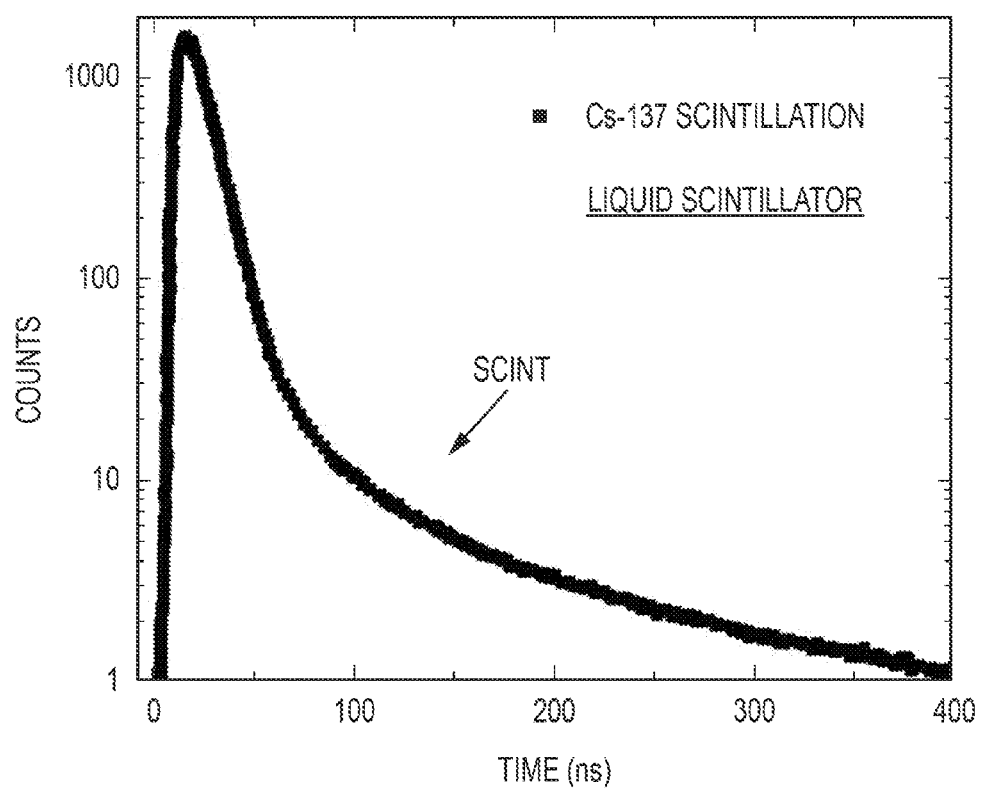
FIG. 11 is a gamma scintillation decay curve for a representative liquid scintillator.

FIG. 11 is a $^{137}$Cs gamma scintillation decay curve for a representative liquid scintillator, for example BC-501. The number of counts is shown on the vertical axis, with arbitrary scaling. The decay curve is plotted over a period of 400 ns on the horizontal, the interval over which the scintillation pulse decays to approximately 0.1% of its initial amplitude. This may be substantially longer than the approximately four-fold shorter interval of 100 ns, as determined for compounds C1 and C3 in FIGS. 10A and 10B.

These observations of fast emission characteristics may reflect static and dynamic quenching in luminescent materials, including the observation of oxygen-induced Stern-Volmer (SV) and triplet quenching in liquid scintillator materials. A similar approach may be employed using benzophenone as a singlet and triplet quencher to produce ultra-fast, sub-nanosecond scintillators suitable for use in high-rate environments. Unfortunately in some examples, such "quenched" organic scintillators may sacrifice light yield and PSD particle discrimination for fast timing characteristics. The use of quenched materials is thus generally limited to high-rate scintillation counting applications, or time-of-flight particle discrimination techniques.

E. PSD Particle Discrimination

In contrast, examples of high-symmetry organic scintillators (e.g. $C_3$-symmetric single crystals) described here may exhibit different behaviors that may not be consistent with the luminescence quenching mechanisms outlined above. This includes the observation of enhanced neutron/gamma discrimination, relative to single crystals of the parent chromophores.

Figure 12A:
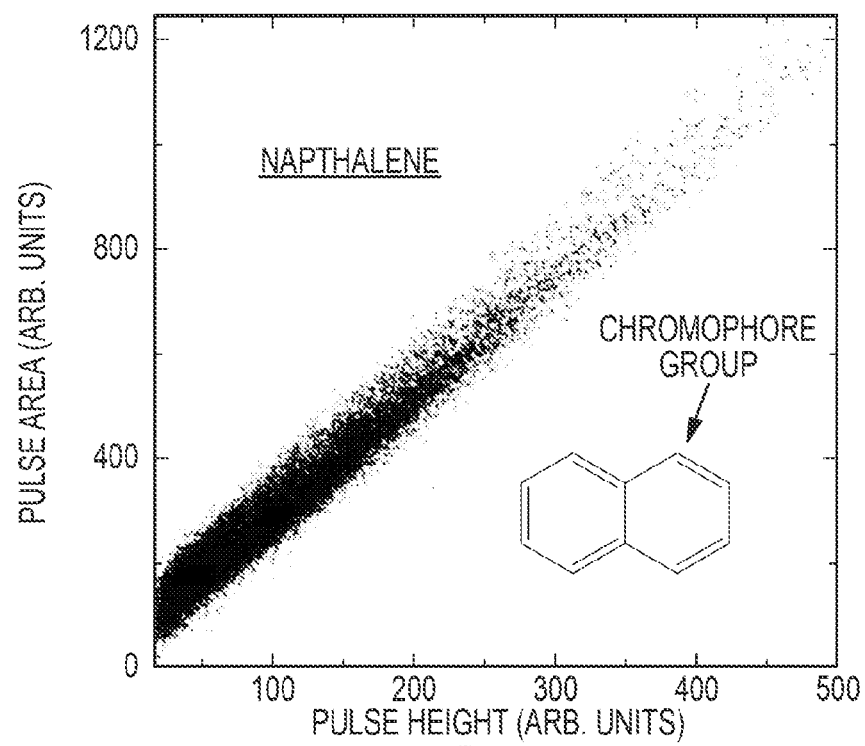
FIGS. 12A and 12B are neutron/gamma pulse-shape discrimination (PSD) scatter plots for single crystals of selected low-symmetry organic scintillators.
Figure 12B:
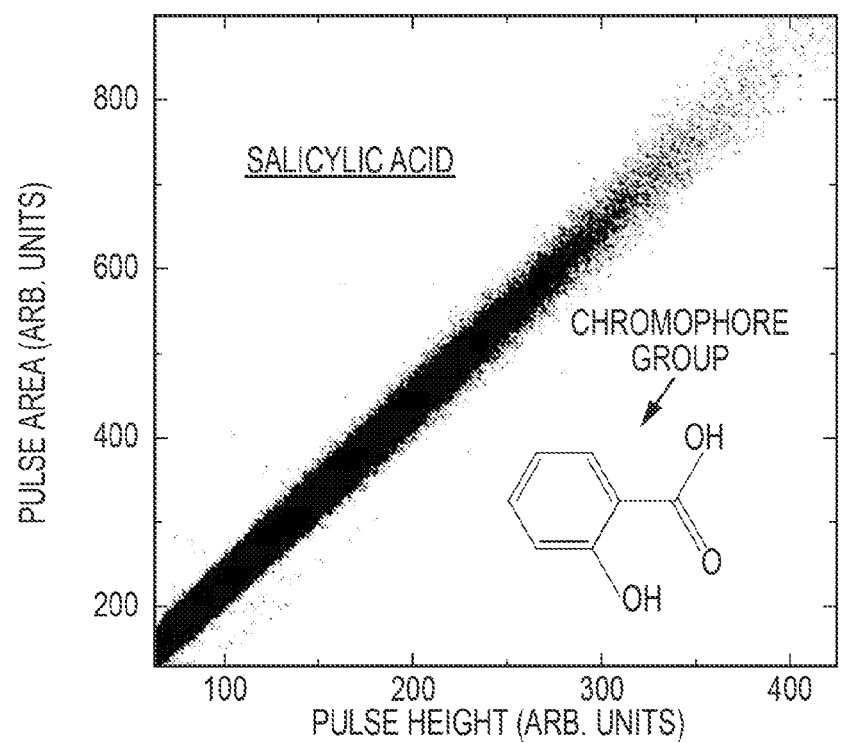

FIGS. 12A and 12B are neutron/gamma pulse-shape discrimination (PSD) scatter plots for single crystals of selected low-symmetry organic scintillators, for example naphthalene (FIG. 12A) and salicylic acid (FIG. 12B), respectively. The integrated pulse area is scaled on the vertical axis, in arbitrary units. The pulse heights are on the horizontal axis, also with arbitrary scaling. Relevant molecular structures are also included, highlighting the active chromophore groups of each compound.

Figure 13A:
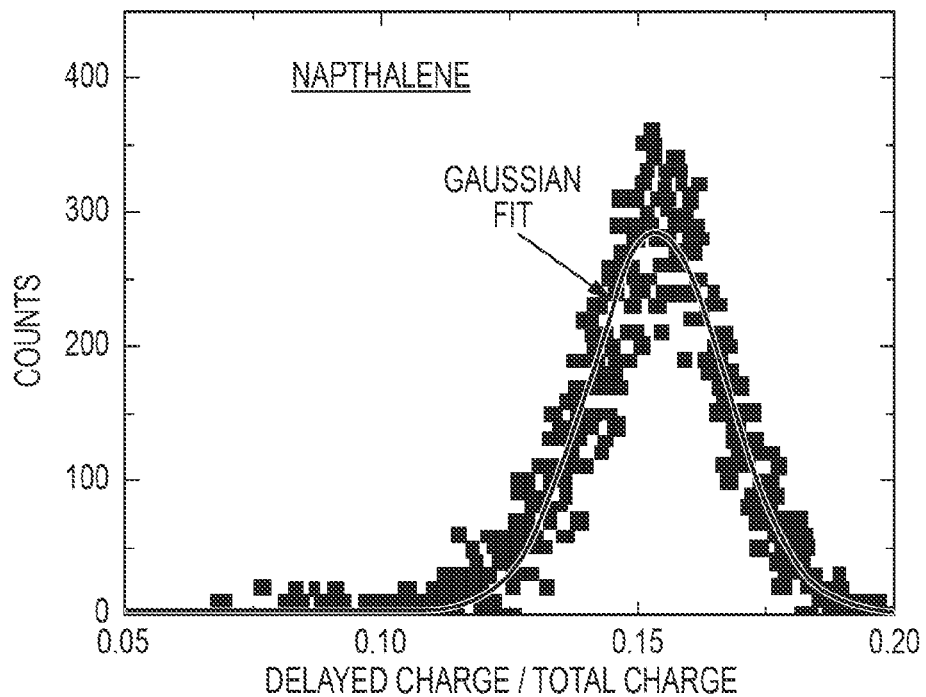
FIGS. 13A and 13B are histograms of the delayed/total charge ratio, corresponding to the PSD scatter plots of FIGS. 12A and 12B, respectively.
Figure 13B:
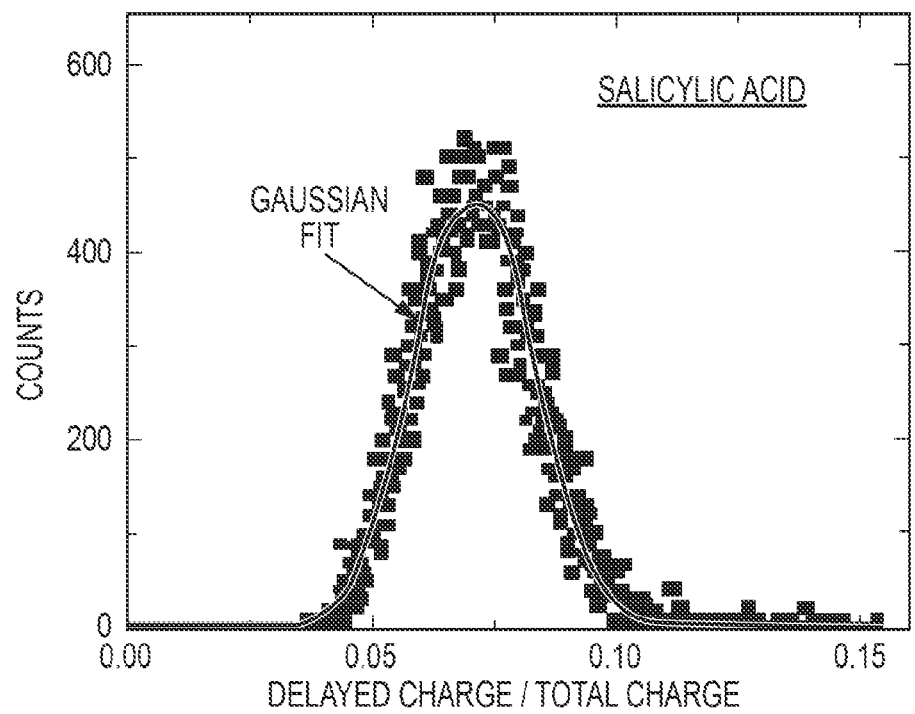

FIGS. 13A and 13B are histograms of the delayed/total charge ratio, corresponding to the PSD scatter plots of FIGS. 12A and 12B. The number of counts is shown on the vertical axis, with arbitrary scaling. The ratio of delayed to total charge ($Q_{delayed}/Q_{total}$ or $Q_D/Q_T$) is displayed on the horizontal axis, in absolute units. Gaussian fits (G) used in the pulse-shape discrimination figure of merit (PSD-FOM) calculations are shown as continuous lines.

Suitable reference crystals of naphthalene and salicylic acid may be obtained through additional purification and recrystallization of ≥99% pure starting materials, for example by confirming the final purities using liquid chromatography-mass spectrometry. The scatter plots in FIGS. 12A and 12B describe pulse-shape discrimination measurements for such relatively lower-symmetry scintillator materials, characterized by comparing pulse integral to pulse height.

The histograms of FIGS. 13A and 13B provide results for the ratio of delayed/total charge, for example as obtained according to the charge-comparison method described above. For the low-symmetry scintillator materials user here, the charge ratio histograms exhibit a characteristic single-mode distribution, including both neutron and gamma ray events. This may demonstrate the relatively weak or substantially non-existent pulse-shape discrimination provided by such low-symmetry scintillators, including single crystal (monoclinic) naphthalene and salicylic acid materials, and single-crystal ammonium salicylate.

Figure 14A:
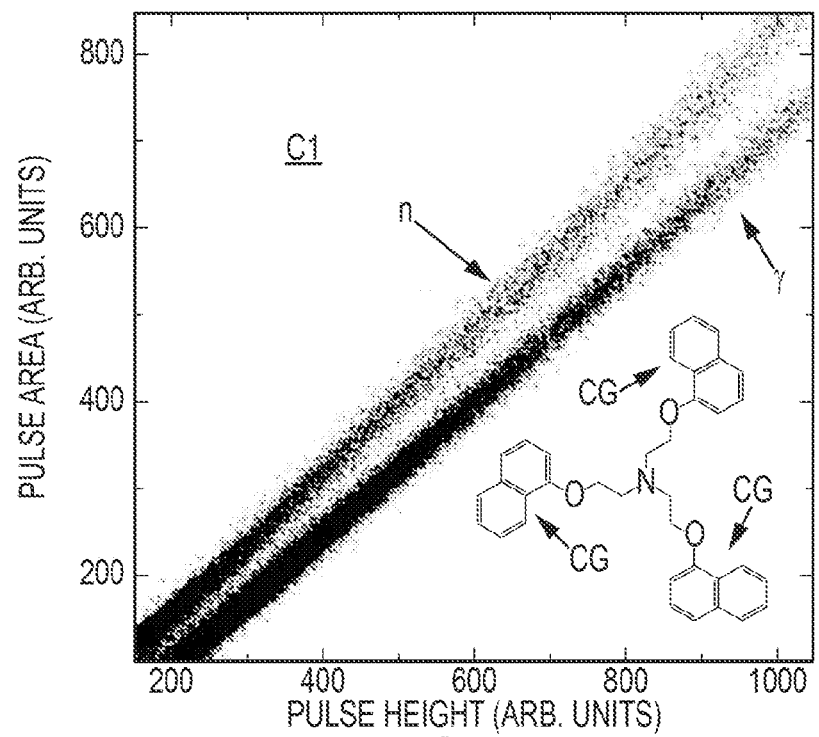
FIGS. 14A and 14B are neutron/gamma pulse-shape discrimination scatter plots for representative high-symmetry organic compounds in accordance with examples of the present invention.
Figure 14B:
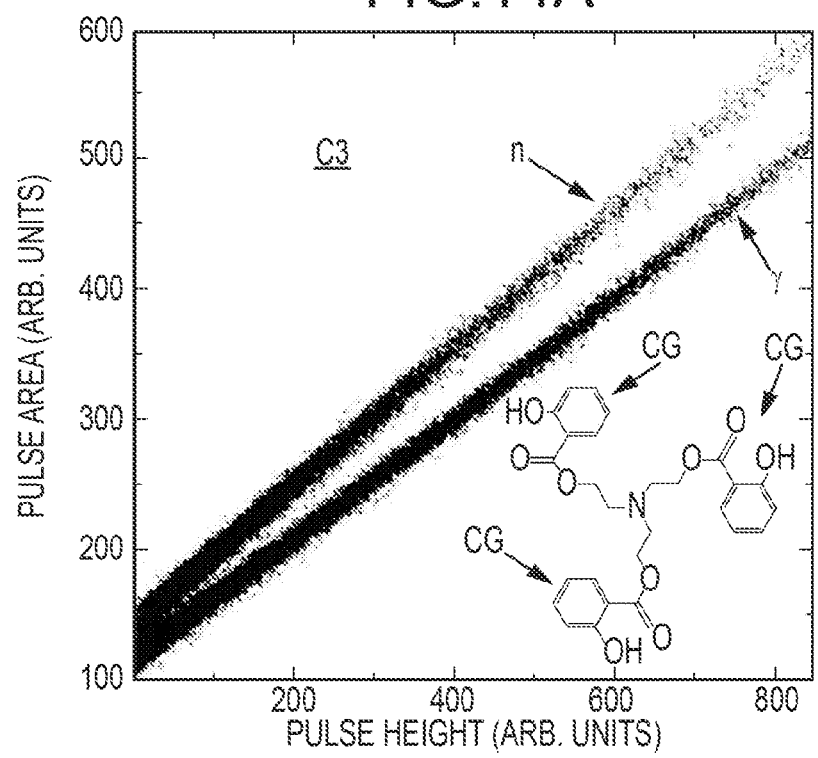
Figure 15A:
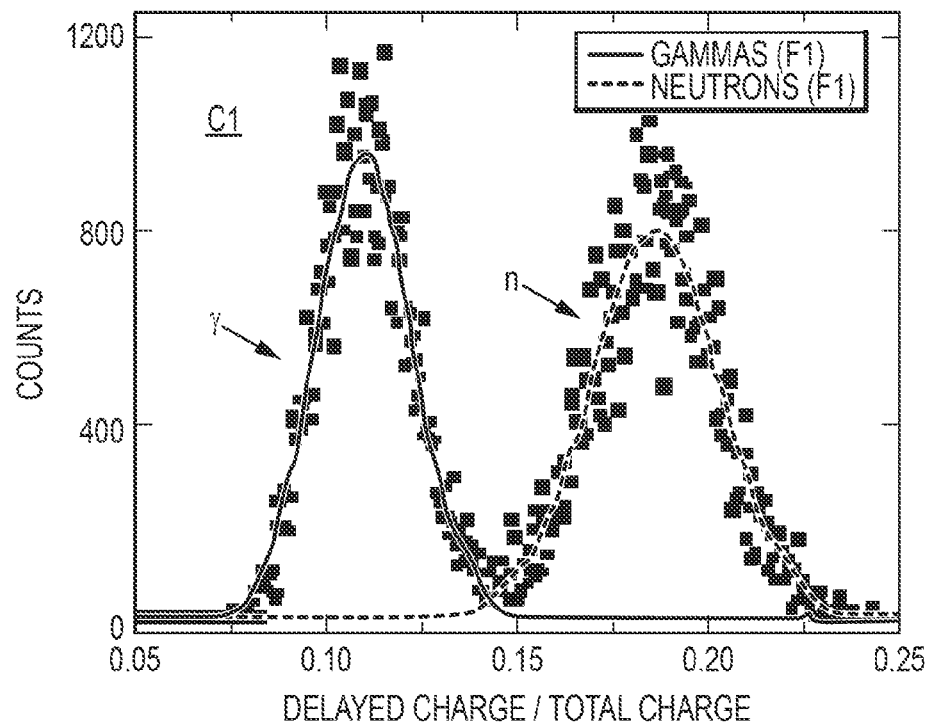
FIGS. 15A and 15B are histograms of the delayed/total charge ratio, corresponding to the PSD scatter plots of FIGS. 11A and 14B, respectively, in accordance with examples of the present invention.
Figure 15B:
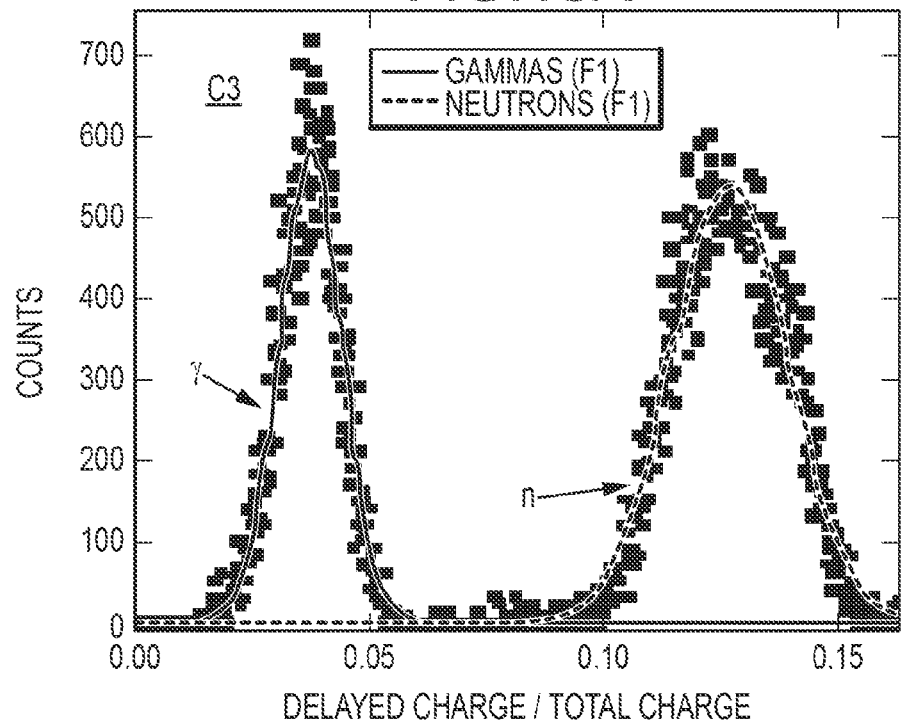

FIGS. 11A and 14B are neutron/gamma pulse-shape discrimination (PSD) scatter plots for representative high-symmetry organic compounds C1 (FIG. 14A) and C3 (FIG. 14B), as described above for the reference plots in FIGS. 12A and 12B, with active chromophore groups highlighted in the relevant molecular structures. FIGS. 15A and 15B show the corresponding charge ratio histograms for $Q_{delayed}/Q_{total}$.

Particle discrimination results for compounds C1 and C3 are summarized in the scatter plots of FIGS. 14A and 14B, which illustrate the neutron/gamma ray pulse-shape discrimination capabilities of these high-symmetry organic compounds. In particular, neutron events (n) in the upper branch typically correspond to pulses with a larger ratio of area to height than the gamma ray events (γ) in the lower branch. Similarly, the neutron events have larger delayed to total charge ratios ($Q_{delayed}/Q_{total}$), as shown in the in pulse-shape discrimination figure of merit (PSD-FOM) histograms of FIGS. 15A and 15B.

The PSD-FOM histograms thus define the separation between neutron (n) and gamma ray (γ) event peaks, for example according to:

$$FOM = \frac{S_{n\gamma}}{F_n + F_\gamma}, \qquad (4)$$

where $S_{n\gamma}$ is the peak separation and $F_n+F_\gamma$ is the sum of the full width at half maximum (FWHM) values for the neutron and gamma ray distributions, respectively.

The values used in figure of merit analysis can be obtained via a Gaussian fit process, as described above, and as shown in FIGS. 15A and 15B. Alternatively, the peak centroids may be used, or another statistical measure of relative peak separation. Similar analyses can also be performed using different measures of the charge accumulation and corresponding signals, for example based on a rise time (or fall time) distribution, or using any combination of prompt, delayed, fast, slow, and total charge values, and corresponding relative values and ratios.

In the particular example of FIGS. 15A and 15B an AmBe source was used, at a trigger level of 400 keVee (equivalent electron energy), calibrated using $^{133}$Ba and $^{137}$Cs sources. For liquid, plastic, and crystalline scintillator materials, an equivalent electron energy level of 400 keVee corresponds to proton energies between about 1 MeV and about 2 MeV, but careful calibration and analysis are required to establish an equivalent energy scale for any particular material.

Based on the Gaussian fit method of Equation 4, PSD-FOM values of 1.52±0.05 and 2.37±0.02 were obtained for high-symmetry compounds C1 and C3, respectively. These results compare favorably to a reference value of 2.10±0.02 for an equivalent volume of liquid scintillator, as obtained from data collected under the same experimental conditions, for example using an EJ-301 liquid scintillator for the reference, from Eljen Technology of Sweetwater, Tex.

Gamma-rejection ratios (GRRs) in the absence of neutrons are evaluated for $^{137}$Cs gammas at the trigger threshold of 400 keVee, using a discriminator threshold set to retain about 98% of the detected neutrons. The discrimination threshold can be derived, for example, from Gaussian fits to the neutron histogram distributions, as shown in FIGS. 15A and 15B. For each analysis, the number of misidentified gamma events for the reference (liquid) scintillator and comparable volumes of compounds C1 and C3 were counted, for a total of 10,000 events. The associated GRRs were determined to be about 1.2×10 for the reference scintillator (e.g., EJ-301), as compared to a value of about 6.3×10$^{-3}$ for compound C1, and about 6×10$^{-4}$ for compound C3. These results indicate an approximately ten-fold difference in the observed GRRs for the observed PSD-FOM values of about 1.5 for compound C1 and about 2.4 for compound C3, respectively.

F. Scintillation Light Yield Measurements

Figure 16:
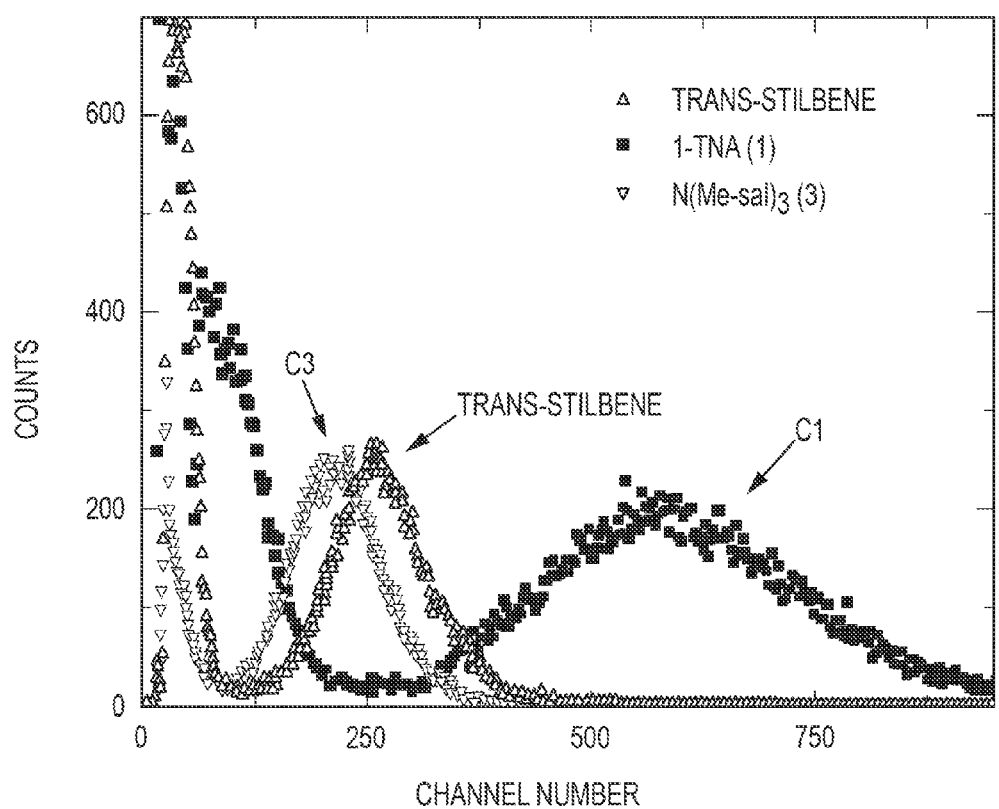
FIG. 16 is a plot of pulse-height spectra for representative high-symmetry organic compounds in accordance with examples of the present invention.

FIG. 16 is a plot of pulse-height spectra for representative high-symmetry compounds C1 and C2, as compared to trans-stilbene. The number of counts is scaled on the vertical axis, in arbitrary units, with channel number on the horizontal (also arbitrary). In this particular example, the spectra were obtained using $^{241}$Am alpha particles, with a 1 μs integration time.

As shown in FIG. 16, the scintillation light yields for high-symmetry organics compounds C1 and C3 are at least comparable to that of trans-stilbene. For example, the pulse-height measurements indicate that organic compound C1 has a 5.5 MeV alpha light yield of about 225% of the reference value for trans-stilbene, with an energy resolution of about 46%. Organic compound C3 has a light yield of about 83% of that for trans-stilbene, with an energy resolution of about 45%. The corresponding 5.5 MeV alpha energy resolution for a similarly sized crystal of trans-stilbene is about 38%.

The observation of pulse-shape discrimination in compounds C1, C2 and C3 is also associated with fast scintillation decay kinetics, as described above with respect to FIGS. 10A and 10B. The confluence of these properties indicates that high-symmetry scintillators may not be subject to the simple Stern-Volmer and triplet quenching processes that govern traditional "quenched" organic scintillators. Instead, the observed behaviors may be attributed to enhanced triplet mobility and transport in the high-symmetry scintillator structures, as confirmed by density-functional theory (DFT) calculations. These observations can also be interpreted within the framework of electron and phonon transfer integrals, for example where these processes may interact more efficiently in high-symmetry structures via mixing of off-diagonal Hamiltonian matrix elements.

IV. Photomultiplier Systems and Methods

Figure 3:
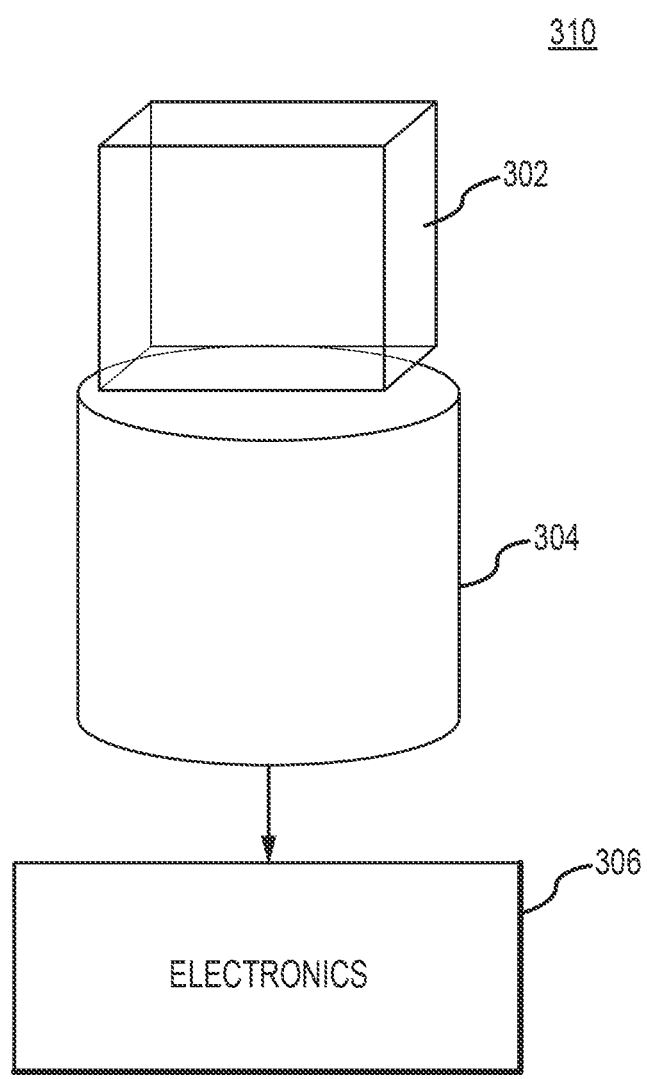
FIG. 3 is a schematic illustration of a scintillator system configured to perform pulse-shape discrimination (PSD).
Figure 17:
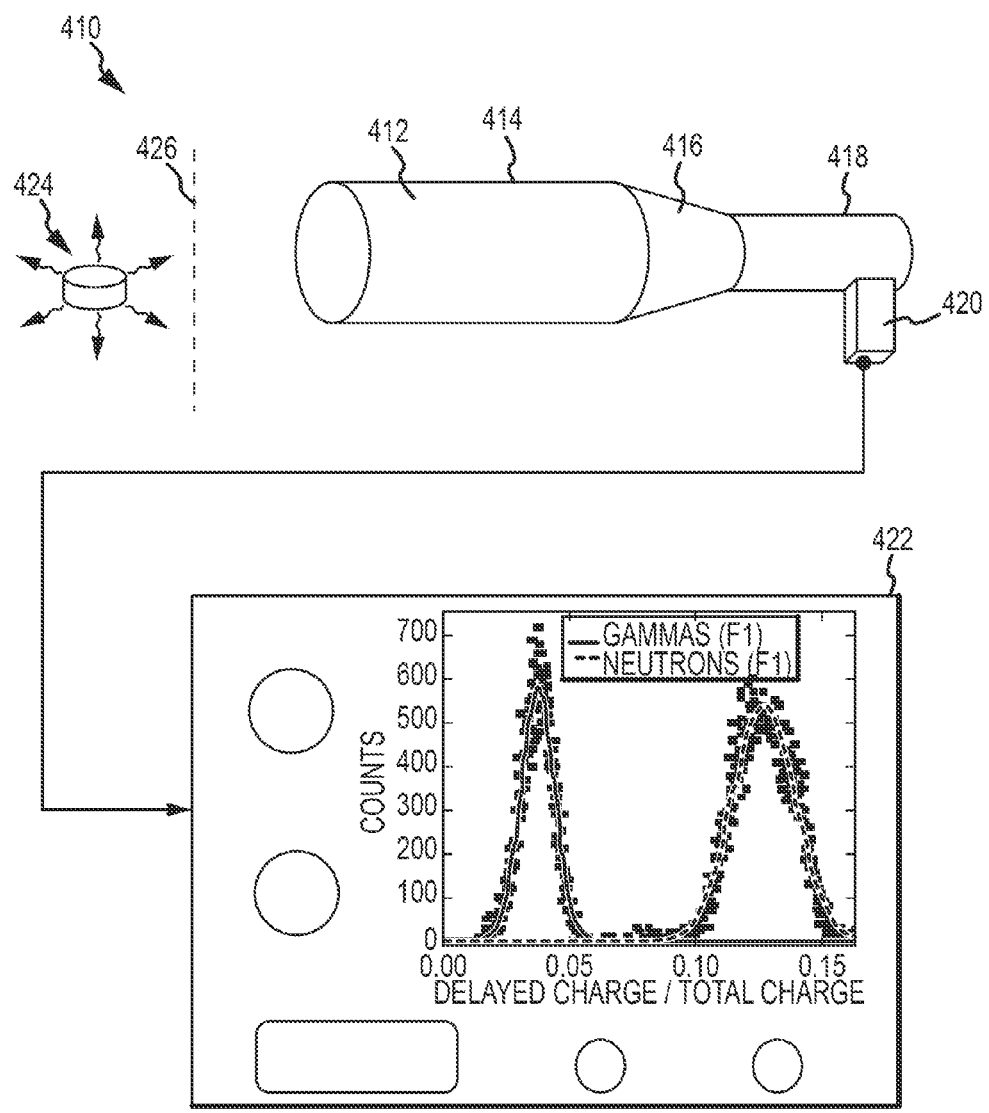
FIG. 17 is a schematic view of a detector system utilizing a high-symmetry organic scintillator material in accordance with examples of the present invention.

Generally, the PSD system of FIG. 3 of the detector system of FIG. 17 may be used in examples of the present invention. The scintillating material may be implemented using a high-symmetry organic crystal scintillator compound or similar scintillating material, as described herein.

FIG. 17 is a schematic view of a scintillator detector system 410, utilizing a high-symmetry organic scintillator material 412. As shown in FIG. 17, system 410 includes scintillator 412, housing 414, coupling 416, and photon detector 418. Depending upon configuration, an electronic module 420 may also be provided for amplification, shaping, and signal propagation for transmitting the signal to a digital pulse shape discriminator and/or spectroscopic analysis system 422.

Spectrum analysis system 422 may include a pulse-height discriminator, spectrum analyzer, or both, configured for provide pulse-shape discrimination and neutron/gamma separation for location and identification of radiation source 424. For example, pulse-shape discrimination can be utilized to distinguish neutron and gamma rays signals from one another, and the different neutron and gamma ray signal spectra can be used to identify fissile sources 424 and special nuclear materials, either in isolation, or within (or behind) a container, wall, building, vehicle, or other shielding structure or shielding material 426.

Scintillator material 412 is formed of a high-symmetry organic crystalline compound that emits light (photon signals) in response to ionizing radiation, including any combination of luminescence, fluorescence, and scintillation light. Suitable scintillator materials 412 are selected to include organic scintillator crystals with higher-order symmetries, for example as obtained via targeted synthesis of C3-symmetric core structures, as described herein.

Housing 414 may be formed of a metal, plastic, or other suitable material, typically light-tight and conforming to the shape of scintillator material 412. Alternatively, a flexible wrap such as TEFLON tape may be utilized, or a conformal coating.

Depending on configuration, a light pipe 416 or other optical coupling can be provided within housing 414, in order to transmit photons generated in scintillator 412 to detector 418. A fiber optic or other light transmission system 416 can also be utilized, for example to transport photons generated in scintillator 412 to a remote detector 418, located outside housing 414.

Alternatively, detector 418 may be directly coupled to scintillator 412 using an interfacial material such as optical grease. Multichannel and pixelated designs are also contemplated, for example using an array of individual scintillator modules 412 coupled to one or more single or multi-channel photomultiplier tubes or other detector systems 418 via a series of optical cables.

Detector 418 is configured to generate an electronic signal based on the scintillation light or other photon signal produced by scintillator material 412. In some applications, a photomultiplier tube or PMT is utilized, for example a single-channel PMT coupled directly to scintillator 412 via a light pipe or other coupling element 416 within housing 414, or a multi-channel design with optical cabling as described above. Other photon detectors 418 can also be used, including, but not limited to, silicon-based photomultipliers, multi-pixel photon counters, microchannel plate devices, semiconductor photodiodes, and other solid state photon detector systems.

Electronics module 420 provides pulse shaping and amplification components selected to more effectively transmit signals from a photomultiplier or other photon detector 418 to a pulse-height discriminator or spectroscopic analysis system 422. For example, electronics module 420 may comprise an analog preamplifier or filter coupled to detector 418, for signal transmission to a remote spectral analysis system 422. Alternatively, electronics module 420 may provide digital signal processing.

Spectroscopy system 422 includes digitizing, processor and memory components configured to process signals from photon detector 418, based on signals generated in scintillator 412 in response to the passage of ionizing radiation from source 424 through scintillating material 412. In particular, spectroscopy system 422 is configured to perform pulse-shape discrimination (PSD) as described herein, for example in combination with spectroscopic and energy analysis of the discriminated signals in order to identify source 424.

Applications of system 410 include non-proliferation, border crossing inspections, and passive detection of uranium, plutonium, and other radioactive materials. In non-proliferation and verification applications, for example, spectroscopy system 422 may be configured to perform PSD-based fast neutron and gamma ray discrimination with higher rate capability due to the faster decay kinematics, and to provide spectrum analysis in order to identify a wide variety of ionizing radiation sources 424, for example in the form of special nuclear materials, including fissile isotopes.

System 410 may also be applicable to reactor monitoring, neutron spectroscopy, and high energy physics (e.g., neutrino and anti-neutrino) detection, based on the improved pulse-shape discrimination and energy spectrum sensitivity. This may compare favorably in some examples to existing technologies based on trans-stilbene and other monoclinic scintillator materials, which may exhibit more limited resolution due to the effects of light-emission anisotropy.

Figure 18A:
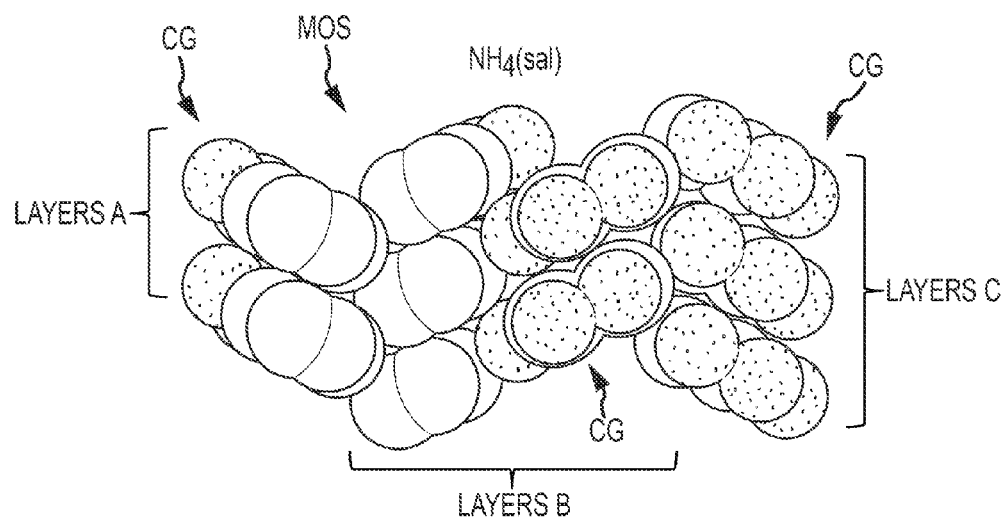
FIG. 18A is an illustration of a lower-order symmetry (monoclinic) organic scintillator crystal structure.

FIG. 18A is an illustration of a lower-order symmetry organic scintillator structure, for example a monoclinic organic scintillator (MOS) such as $NH_4(sal)$. For this material, the chromophore groups (CG) are arranged in a series of "herringbone" layers A, B, C, as described above.

Figure 18B:
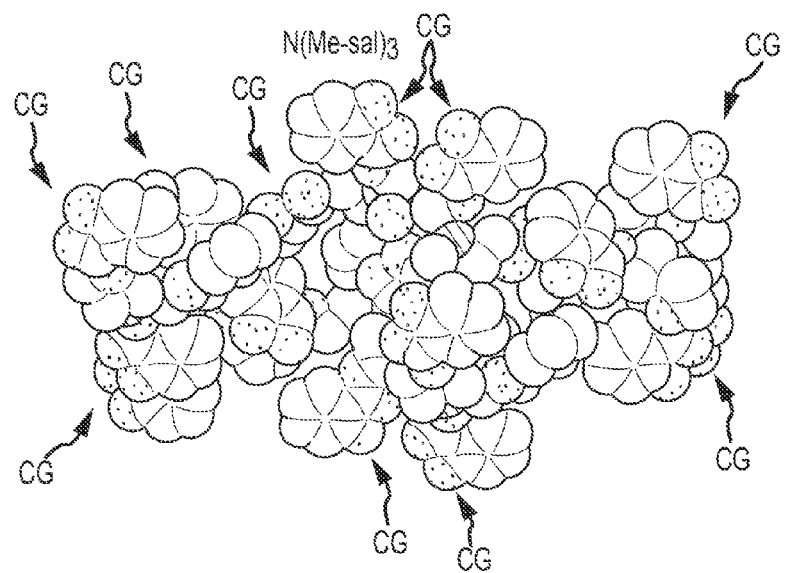
FIG. 18B is an illustration of a higher-order symmetry organic scintillator crystal structure in accordance with examples of the present invention.

FIG. 18B is an illustration of a higher-order symmetry organic scintillator structure, for example a representative orthorhombic crystal such as compound C3 or tris(2-hydroxybenzoyloxy)triethylamine. In this particular example, the scintillator crystallizes in an orthorhombic C222 space group, but other orthorhombic, trigonal, tetragonal, hexagonal, and cubic space groups are also encompassed, including but not limited to one or more of space groups R-3, P2(1)3, C222, Pa-3, Pnma, I-43d and Fd-3c (see, e.g., Table II).

Figure 19A:
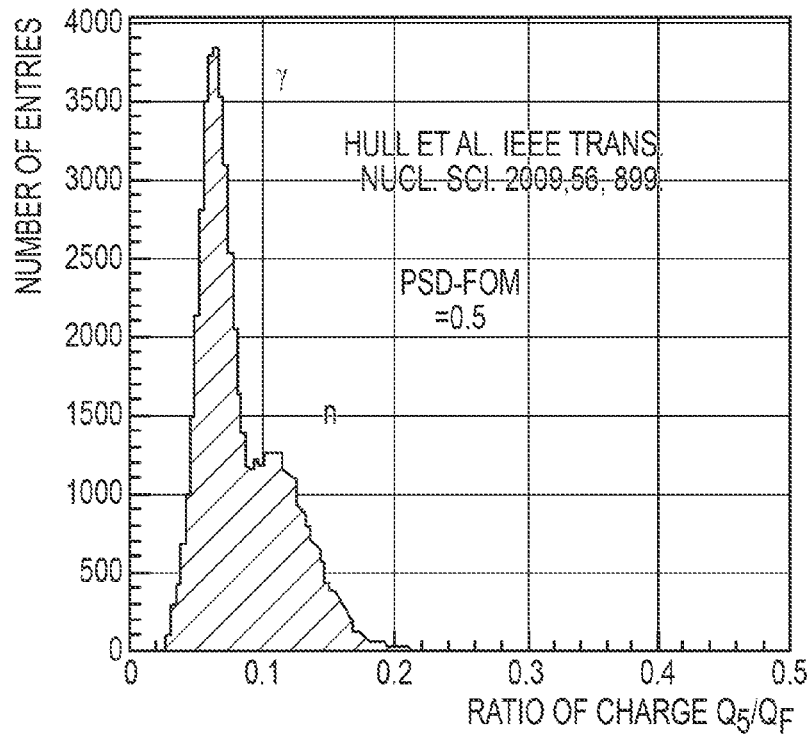
FIG. 19A is a charge ratio histogram for the lower-order symmetry scintillator of FIG. 18A.

FIG. 19A is a charge ratio histogram for the lower-order symmetry organic scintillator of FIG. 18B, with number of counts scaled in arbitrary units on the vertical axis. In this example, the pulse-shape discrimination figure of merit (PSD-FOM) is based on the ratio of slow (or delayed) and fast (or prompt) charge contributions, $Q_S/Q_F$.

Figure 19B:
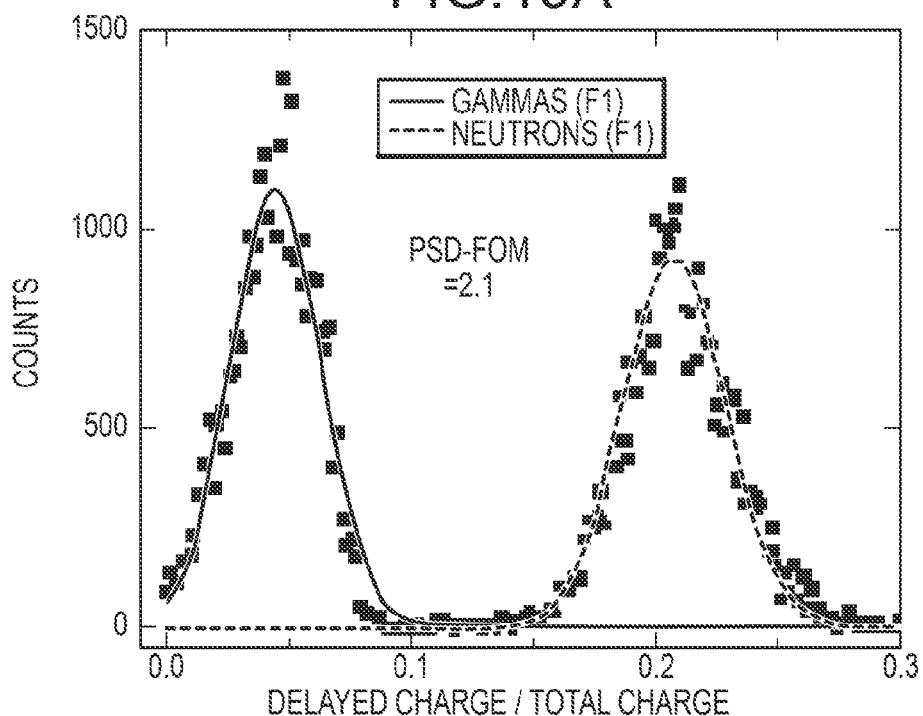
FIG. 19B is a charge ratio histogram for a representative liquid scintillator material.

FIG. 19B is a charge ratio histogram for a representative liquid scintillator material, for example EJ-301 from Eljen Technology. In FIG. 19B, the pulse-shape discrimination figure of merit (PSD-FOM) is based on the ratio of delayed to total charge ($Q_D/Q_T$), using the peak separation over the combined full width at half maximum values, as described above.

As shown in FIG. 19A, a degree of neutron and fast gamma discrimination may be possible in existing (e.g., monoclinic) organic scintillator materials, but the separation may be substantially less than that for the representative liquid scintillator material, as shown in FIG. 19B. This is reflected in the substantially lower figure of merit value of about 0.5 for the low-symmetry organic crystal, as compared to about 2.1 for the liquid scintillator. A notable exception to this behavior is the monoclinic crystal trans-stilbene, which possesses the highest PSD figure-of-merit value among known organic scintillators, although the use of this material is constrained by other performance limitations such as brittleness, anisotropic light emission, and high cost, as described above.

Comparing to FIGS. 15A and 15B, the representative high-symmetry (e.g., synthetic) organic compounds demonstrate substantially better neutron/gamma discrimination than the low-symmetry (e.g., monoclinic) materials, with improved pulse-shape discrimination relative to the lower-symmetry parent chromophores. In particular, the representative figures of merit of about 1.52 for compound C1 and about 2.37 for compound C3 are each substantially greater than 1.2, and comparable to or even higher than the corresponding figure or merit for the representative liquid scintillator. In addition, the observation of pulse-shape discrimination in high-symmetry synthetic compounds is associated with fast scintillation decay kinetics and timing characteristics, as shown in FIGS. 10A and 10B, and the unquenched scintillation light yields are at least comparable to those of existing monoclinic scintillators such as trans-stilbene, as shown in FIG. 16.

Exemplary benefits of organic crystal scintillator systems described herein may stem at least in part from an increase in the molecular point-group symmetries. Experimental results indicate that these properties may not be simply the result of variations in the electronic structures of the chromophores, however, but are also impacted by the solid-state packing structures. Density function theory calculations may confirm in some examples that the magnitudes of triplet exchange interactions are controlled by the molecular and crystallographic properties. The DFT calculations also show that the high-symmetry structures of compounds C1 and C3 and the other high-symmetry organic scintillator compounds described herein possess significantly stronger intermolecular triplet interactions than in existing crystal scintillators, including naphthalene and salicylic acid, respectively. These findings indicate that targeted structural modifications of known (e.g., lower-symmetry) scintillating groups provide improved organic scintillator crystals, with improved triplet transport and pulse-shape discrimination.

Existing crystalline organic scintillators tend to be monoclinic, exhibiting lower-order spatial symmetry effects in packing and structure. Repeated molecular stacking or layering also results in preferential propagation effects, with triplet-triplet interactions occurring along the corresponding planes, as determined by the corresponding coupling constants and exchange interactions.

Higher-symmetry organic scintillator materials can also exhibit improved mechanical, refraction, scattering, and stress dissipation properties. For crystals in cubic space groups and other high-symmetry crystal systems (e.g., orthorhombic, tetragonal, trigonal, hexagonal), polycrystalline powder-based systems are possible due to the presence of a large number of independent slip systems and a reduction or elimination of light scattering at grain boundaries. These respective properties are desirable for the production of large-scale transparent polycrystalline samples according to mechanical consolidation processes. In single crystal embodiments, further improvements are possible in both the mechanical and optical properties.

In high-symmetry (greater than monoclinic) structures, there may be fewer unique cell parameters, as compared to existing low-symmetry (monoclinic) scintillator crystals. Depending upon application, a synthesized molecular "scaffolding" can provide an improved support structure for the chromophores, scintillating moieties, or "active" (photon-producing) groups (e.g. C1-C3). Classes of substantially "all-active" materials can also be produced (e.g. hexabenzyltruxene).

To synthesize structures enforcing suitable higher-order symmetries, atoms that form tetrahedral, trigonal pyramidal, and trigonal planar bonds may be utilized, for example nitrogen, phosphorus, carbon, silicon, and germanium. Cubic structures may also be generated, for example utilizing non-cubic organic molecules that pack in cubic form, including synthetic "designed" molecules with light-producing (e.g., chromophore) groups, and suitable packing geometries. Orthorhombic, trigonal, and other non-monoclinic structures may also or instead be generated (see, e.g., Table II).

Suitable attachment and bonding chemistries include but are not limited to condensation reactions, nucleophilic substitution, and Suzuki coupling reactions. Suitable bulk properties can be selected, including mechanical stability and optical transparency on the scale of a few cubic centimeters up to a cubic meter or more. The improved pulse-shape discrimination and energy spectrum sensitivity also compares favorably with existing technologies based on trans-stilbene and other monoclinic materials, which may exhibit more limited energy resolution due to emission anisotropy effects.

Applications include active and passive detection of uranium, plutonium, and other radioactive materials for use in nuclear non-proliferation and border crossing security systems. In non-proliferation and verification applications, for example, PSD-based fast neutron and gamma ray discrimination can be provided in combination with higher rate capability due to the faster decay kinematics, in order to identify sources in the form of special nuclear materials, including fissile isotopes. Additional applications include reactor monitoring, neutron spectroscopy, and particle detection for high energy physics applications, including neutrino and anti-neutrino detectors for astrophysics and cosmic ray, reactor, and accelerator-based monitoring and particle physics research.

In particular embodiments of these scintillator systems, a high-symmetry organic scintillating compound can be selected to emit photon signals in response to passage of ionizing radiation. These high-symmetry compounds typically have crystal symmetry that is of higher order than monoclinic, or higher order than orthorhombic (e.g., at least trigonal, hexagonal, cubic, or tetragonal).

A photomultiplier or other photon detector can be optically coupled to the organic scintillating compound or material, and configured to generate electronic signals based on the photon signals. The pulse shapes of the signals are characterized by fast and slow components of the photon signals emitted by the scintillator. A discriminator is coupled to the detector, and configured to discriminate between neutron and gamma ray signals in the organic scintillating compound based on relative contributions of the fast and slow components.

Suitable organic scintillating compounds can be synthesized as substantially monocrystalline (single crystal) structures, with improved optical and mechanical properties. The crystal structure may have, for example, orthorhombic, trigonal, tetragonal, hexagonal, or cubic symmetry. The symmetry can also be characterized by a corresponding space group, such as R-3, P2(1)3, C222, Pa-3, Pnma, I-43d or Fd-3c.

In some examples, the scintillating material comprises a naphthyloxy- or methylsalicyl-based compound, or an amine, a triethylamine, or an amine perchlorate, as described above. The scintillating material can also include an ethylenedioxy naphthalene compound, a naphthyl compound, a hexabenzyltruxene compound, a diphenylboron compound, a hexapropyloxytriphenylene compound, or a phosphine dioxide or phosphite.

The fast and slow components of the photon signals can be used to define a figure of merit for discrimination between the neutron and gamma ray signals, with a value greater than 1.2 indicating efficient particle discrimination at a given energy threshold. A spectrum analyzer can also be included, in order to identify the source of the ionizing radiation based on the energy spectra of the different neutron and gamma ray signals.

In detector embodiments, the scintillating material also includes a selected high-symmetry organic crystalline compound, for example one with at least trigonal, hexagonal, cubic, or orthorhombic crystal symmetry. A photon detector is coupled to the scintillating material, and configured to generate electronic signals in response to the photons generated in the scintillating material due to the passage of ionizing radiation. A pulse shape discriminator is coupled to the photon detector, and configured to discriminate between neutrons and gamma rays in the ionizing radiation based on the pulse shapes of the electronic signals.

Suitable scintillating media with substantially trigonal symmetry can be generated from synthesized forms of tris(1-napthalenylethyl)amine, tris(1-naphthyloxy)triethylamine, tris(2-naphthyloxy)triethylamine, and hexabenzyltruxene. Suitable scintillating media with cubic symmetry can be generated from synthesized forms of tris(1-napthalenylethyl)amine perchlorate, [tris(1-naphthyloxy) triethylamine] perchlorate, tris(1-ethylenedioxy naphthalene) phosphine dioxide, tris(diphenylboron)hexaethyltruxene, and hexapropyloxytriphenylene. Suitable orthorhombic scintillating media can be formed of tris(1-methylsalicyl)triethylamine, tris(2-hydroxybenzoyloxy)triethylamine, and tris(1-naphthyl)phosphite. Other suitable scintillating media can be synthesized from 1-TNA, 2-TNA or tris(2-hydroxybenzoyloxy)triethylamine, and these media may have the same or different higher-order symmetries.

In additional embodiments, the organic scintillator comprises a first scaffold component or core moiety, and a second chromophore component or scintillating moiety. In these examples, the first component may be selected from one or more tertiary amines, phosphines, phosphine oxides, and phosphites, and the second component may comprise a chromophore selected from one or more of trans-stilbene, naphthalene, anthracene, biphenyl, 2,5-diphenyloxazole, salicylic acid, methyl salicylate, p-terphenyl, bis-benzoxazolylthiophene, diphenylacetylene, and 9,10-diphenylanthracene.

Tetrahedral organosilocon and tetrahedral organogermanium based scintillator compounds are also contemplated, with the first (scaffold) component comprising silicon or germanium, and suitable organic chromphores directly coordinated to these central atoms. These compounds are directly analogous to the phosphine-type compounds described herein, with suitable coordination number based on the identity of the central atom.

Examples of the scintillating material also cover different classes of scintillating moieties. Some of these classes include dyes that may belong to more than one category, and which are encompassed in their entirety. For example, all coumarin dyes exhibit intramolecular hydrogen bonding, although the reverse is not necessarily true. Suitable classes of scintillating moieties include, but are not limited to:

Fused aromatic compounds. Examples include but are not limited to naphthalene, anthracene, and 9,10-diphenylanthracene.

Linearly conjugated aromatic compounds. Examples include but are not limited to biphenyl and p-terphenyl.

Oxazoles, oxadiazoles, and thiazoles. Examples include but are not limited to 2,5-diphenyloxazole (PPO), 2,2'-(1,4-phenylene)bis(5-phenyl)oxazole (POPOP), 2,5-bis(5'-tert-butyl-2-benzoxazolyl)thiophene (BBOT), 2-(1-naphthyl)-5-phenyloxazole (NPO), and 2-(4-tert-butylphenyl)-5-(4-biphenylyl)-1,3,4-oxadiazole.

Phenylenevinylene-based compounds. Examples include but are not limited to trans-stilbene, 1,4-bis[2-(2-methylphenyl)ethenyl]-benzene (bis-MSB), and 1,1,4,4-tetraphenyl-1,3-butadiene (TPB).

Intramolecular hydrogen bonding compounds. Examples include but are not limited to salicylic acid, and methyl salicylate.

Coumarin-based dyes. Examples include but are not limited to 7-amino-4-methyl-2H-1-benzopyran-2-one (Coumarin 440) and 7-(diethylamino)-4-(trifluoromethyl)-2H-1-benzopyran-2-one (Coumarin 481).

The scintillator systems and ionization radiation detectors described here may operate by generating electronic signals with a photon detector optically coupled to an organic scintillating material. The electronic signals are responsive to the passage of ionizing radiation though the organic scintillator, where the scintillating material has higher-order symmetry (e.g., greater than monoclinic crystalline symmetry), as described above. Discrimination between neutrons and gamma rays is performed based on the pulse shapes of the electronic signals, where the pulse shapes characterize different fast and slow components emitted by the scintillating material, in response to the passage of ionizing radiation.

Separate energy spectra can also be generated for neutrons and gamma rays in the ionizing radiation, and used to identify the radiation source. For these applications, a suitable figure of merit can be generated based on relative contributions of the fast and slow components, with a "good" or effective pulse-shape discrimination indicated by a figure of merit value that is at least one, or greater than one, or greater than or equal to some other threshold.

While this disclosure has been made with reference to exemplary embodiments, it will be understood by those skilled in the art that various changes can be made and equivalents may be substituted without departing from the spirit and scope of the invention. Thus, the invention is not limited to the particular examples that are disclosed, but also encompasses all the embodiments falling within the scope of the appended claims, including various modifications made to adapt the teachings of the invention to different materials, situations and circumstances.

What is claimed is:

1. A scintillator system comprising:
   an organic scintillator comprising a tetrahedral organosilicon or organogermanium scintillator compound, the compound comprising:
      a scaffold component comprising a silicon or germanium central atom, and
      an organic chromophore coordinated therewith, wherein a coordination number is selected based on the central atom;
   a photodetector optically coupled to the organic scintillator, the photodetector configured to generate electronic signals having pulse shapes characterized by fast and slow components of light emitted by the organic scintillator in response to ionizing radiation; and
   a discriminator coupled to the photodetector, the discriminator configured to discriminate between different types of the ionizing radiation based on relative contributions of the fast and slow components to the pulse shapes.

2. The scintillator system of claim 1, wherein the scaffold component comprises the silicon central atom.

3. The scintillator system of claim 1, wherein the scaffold component comprises the germanium central atom.

4. The scintillator system of claim 1, wherein the organic chromophore is selected from the group consisting of naphthalene and salicylate.

5. The scintillator system of claim 4, wherein the organic chromophore is naphthalene.

6. The scintillator system of claim 4, wherein the organic chromophore is salicylate.

7. The scintillator system of claim 1, wherein the scintillator compound is a substantially monocrystalline structure.

8. A method for providing a scintillator system, the method comprising:
   providing an organic scintillator having a tetrahedral organosilicon or organogermanium scintillator compound, the tetrahedral organosilicon or organogermanium scintillator compound comprising:
      a scaffold component comprising a silicon or germanium central atom, and
      an organic chromophore coordinated therewith, wherein a coordination number is selected based on the central atom;
   optically coupling a photodetector to the organic scintillator, the photodetector configured to generate electronic signals having pulse shapes characterized by fast and slow components of light emitted by the organic scintillator in response to ionizing radiation; and
   coupling a discriminator to the photodetector, the discriminator configured to discriminate between different types of the ionizing radiation based on relative contributions of the fast and slow components to the pulse shapes.

9. The method of claim 8, wherein the scaffold component comprises the silicon central atom.

10. The method of claim 8, wherein the scaffold component comprises the germanium central atom.

11. The method of claim 8, wherein the organic chromophore is selected from the group consisting of naphthalene and salicylate.

12. The method of claim 11, wherein the organic chromophore is naphthalene.

13. The method of claim 11, wherein the organic chromophore is salicylate.

14. The method of claim 8, wherein the scintillator compound is a substantially monocrystalline structure.

* * * * *